United States Patent
Kato et al.

(10) Patent No.: US 10,542,212 B2
(45) Date of Patent: Jan. 21, 2020

(54) SELF-POSITION ESTIMATION DEVICE AND METHOD

(71) Applicant: SONY CORPORATION, Tokyo (JP)

(72) Inventors: Takaaki Kato, Tokyo (JP); Akihiko Kaino, Kanagawa (JP); Tatsuki Kashitani, Tokyo (JP); Masashi Eshima, Chiba (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 152 days.

(21) Appl. No.: 15/561,834

(22) PCT Filed: Mar. 23, 2016

(86) PCT No.: PCT/JP2016/059086
§ 371 (c)(1),
(2) Date: Sep. 26, 2017

(87) PCT Pub. No.: WO2016/163227
PCT Pub. Date: Oct. 13, 2016

(65) Prior Publication Data
US 2018/0115711 A1    Apr. 26, 2018

(30) Foreign Application Priority Data
Apr. 6, 2015   (JP) .................... 2015-077901

(51) Int. Cl.
*H04N 5/232* (2006.01)
*G06T 7/73* (2017.01)
*H04N 5/247* (2006.01)

(52) U.S. Cl.
CPC .......... *H04N 5/23241* (2013.01); *G06T 7/73* (2017.01); *H04N 5/247* (2013.01); *G06T 2207/10016* (2013.01); *G06T 2207/30244* (2013.01)

(58) Field of Classification Search
CPC ............... G01C 15/00; G01C 21/26; G06T 2207/10016; G06T 2207/30244;
(Continued)

(56) References Cited

U.S. PATENT DOCUMENTS

2008/0291271 A1* 11/2008 Hansson .......... G08B 13/19684
348/143
2010/0157064 A1*  6/2010 Cheng ................ G06K 9/00771
348/169
2012/0162376 A1   6/2012 Ohtomo et al.

FOREIGN PATENT DOCUMENTS

CN    102549382 A    7/2012
EP    2487457 A1    8/2012
(Continued)

OTHER PUBLICATIONS

International Search Report and Written Opinion of PCT Application No. PCT/JP2016/059086, dated Jun. 21, 2016, 08 pages of ISRWO.

*Primary Examiner* — Nirav G Patel
(74) *Attorney, Agent, or Firm* — Chip Law Group

(57) ABSTRACT

The present technology relates to a control device and a control method that make it possible to estimate a self-position reliably with lower power consumption. An activation determination unit selects some of a plurality of cameras as activation cameras to be used for self-position estimation, and on the basis of the selection result of the activation cameras, an activation switching unit sets cameras taken as the activation cameras among the plurality of cameras to an activation state and causes the cameras to photograph images, and suspends the activation of the other cameras. A self-position estimation unit performs self-position estimation on the basis of images photographed by the activation cameras. Further, the activation determination unit selects the activation cameras again at a predetermined (Continued)

timing. The present technology can be applied to a self-position estimation system.

15 Claims, 20 Drawing Sheets

(58) Field of Classification Search
CPC ...... G06T 7/73; H04N 5/225; H04N 5/23241; H04N 5/247
See application file for complete search history.

(56) References Cited

FOREIGN PATENT DOCUMENTS

| | | |
|---|---|---|
| JP | 03-137547 A | 6/1991 |
| JP | 03-137547 A | 12/1991 |
| JP | 2005-184443 A | 7/2005 |
| JP | 2009-109324 A | 5/2009 |
| JP | 2009-237848 A | 10/2009 |
| WO | 2011/043275 A1 | 4/2011 |

* cited by examiner

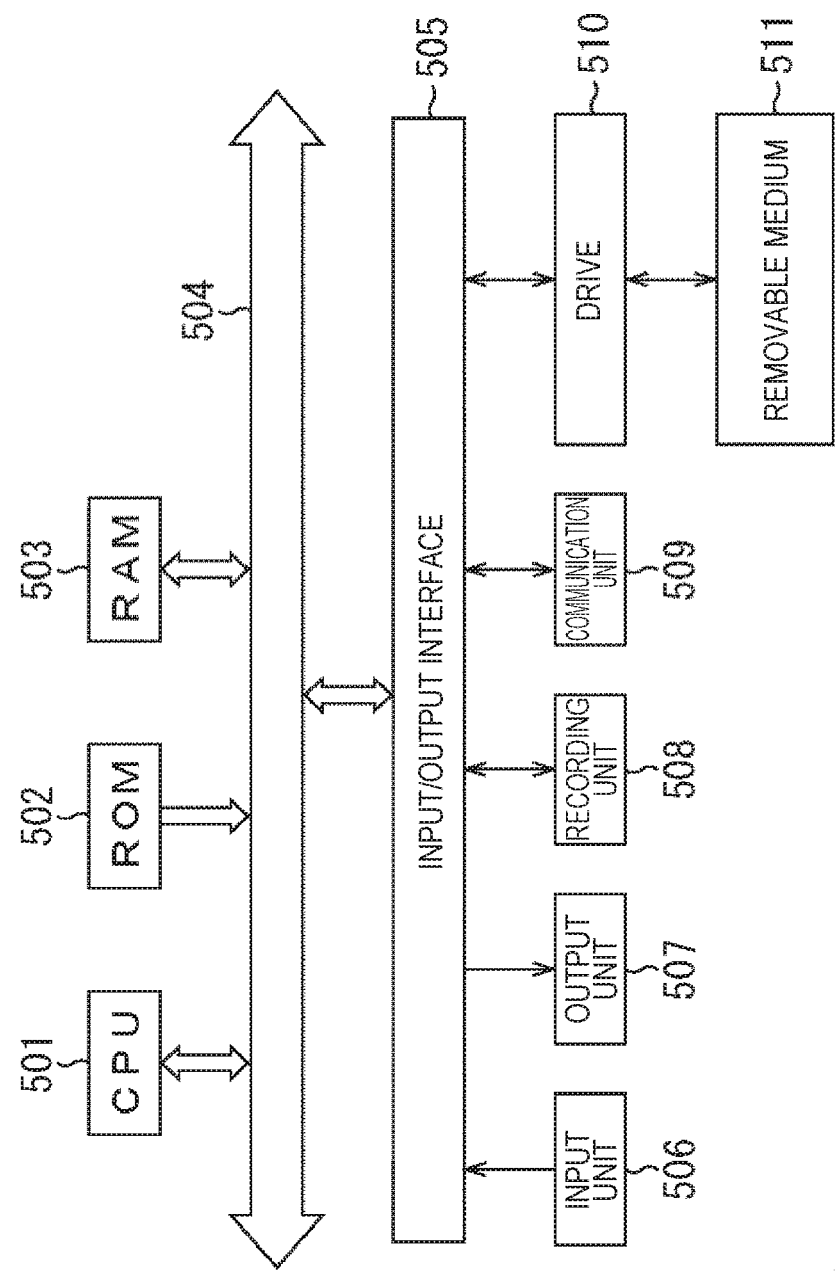

SELF-POSITION ESTIMATION DEVICE AND METHOD

CROSS REFERENCE TO RELATED APPLICATIONS

This application is a U.S. National Phase of International Patent Application No. PCT/JP2016/059086 filed on Mar. 23, 2016, which claims priority benefit of Japanese Patent Application No. JP 2015-077901 filed in the Japan Patent Office on Apr. 6, 2015. Each of the above-referenced applications is hereby incorporated herein by reference in its entirety.

TECHNICAL FIELD

The present technology relates to a control device, a control method, and a program, and relates particularly to a control device, a control method, and a program that make it possible to estimate a self-position reliably with lower power consumption.

BACKGROUND ART

Thus far, in self-position estimation in which the position of a camera on the real space is estimated on the basis of an image photographed by the camera, the self-position of the camera has been estimated by using a gradient, a feature point, etc. serving as an index included in the image (e.g., see Patent Literature 1).

Hence, in a case where there is no feature point or the like in the photographed image, such as in a case where the subject is a white wall, in principle it is impossible to continuously estimate the self-position of the camera.

In practice, there are few situations such as being surrounded by a white wall on all sides, and in many cases, even in a situation where there is no feature point in the front visual field, there are a sufficient number of feature points to perform self-position estimation in the rear, the ceiling, etc.

However, in a case where, for example, a user moves in a room while wearing a camera such as Action Cam used for self-position estimation, when in the room there are few subjects from which a feature point can be detected, the user needs to always face a subject from which a feature point can be detected. Thus, if it is intended that a feature point be always included in the visual field, the movement of the user is restricted, and the degree of freedom is impaired.

On the other hand, in order for the user to be able to move freely and yet avoid a situation where a feature point is not detected from the image, it may be possible to perform self-position estimation using an all-round camera. In this case, a feature point or the like is detected from an image photographed by the all-round camera, and the self-position is estimated.

However, if an image of the surrounding environment is photographed using an all-round camera, although the range on the space in which a feature point can be detected is expanded, the spatial resolution is reduced because the angle of view of the camera is expanded, and consequently the self-position cannot be estimated with sufficient accuracy.

Thus, in order to make it possible to estimate the self-position with sufficient accuracy without restricting the movement of the user, a technology that performs self-position estimation using a plurality of cameras is proposed. In this technology, a plurality of cameras are arranged, and the plurality of cameras function as one wide-angle camera.

If a plurality of cameras are used in this way, the area not observed by the camera, that is, the dead angle can be reduced, and therefore a situation where a feature point is not detected from the image can be avoided; thus, the self-position can be estimated without restricting the movement of the user. Further, since the surrounding environment is photographed by a plurality of cameras, the spatial resolution of the image is not reduced, and the self-position can be estimated with sufficient accuracy.

CITATION LIST

Patent Literature

Patent Literature 1: JP 2009-237848A

DISCLOSURE OF INVENTION

Technical Problem

However, in the technology described above, it is necessary to always photograph the surrounding environment with a plurality of cameras, and therefore the amount of power consumption is increased in association with the increase in the number of cameras used for self-position estimation. In particular, since the amount of power consumption is in direct proportion to the number of cameras, it is necessary to suppress the power consumption in self-position estimation to a low level in a case where it is attempted to perform self-position estimation with a wearable device or the like.

The present technology has been made in view of such situations, and makes it possible to estimate a self-position reliably with low power consumption.

Solution to Problem

A control device according to an aspect of the present disclosure includes: an activation determination unit configured to select some of a plurality of cameras as activation cameras to be used for self-position estimation; and an activation switching unit configured to, on the basis of a selection result of the activation cameras, set the cameras taken as the activation cameras among the plurality of cameras to an activation state and cause the cameras to photograph images, and suspend activation of the camera different from the activation cameras among the plurality of cameras.

The activation determination unit can select the activation cameras again at a predetermined timing.

The activation determination unit can cause a condition to shift, at the predetermined timing, from a sleep mode in which photographing is performed by the activation cameras to a count mode in which all the plurality of cameras are activated, and select the activation cameras on the basis of images photographed by the plurality of cameras in a state of the count mode.

The activation determination unit can select the activation cameras on the basis of a number of feature points detected from the image photographed by the camera.

The activation determination unit can select the activation cameras on the basis of distribution of feature points on a space, the feature points being detected from the image photographed by the camera.

The activation determination unit can select the activation cameras on the basis of distribution of feature points on the image, the feature points being detected from the image photographed by the camera.

The activation determination unit can select the activation cameras on the basis of a number of feature points that correspond to landmarks shown by a three-dimensional map used for the self-position estimation, the feature points being detected from the image photographed by the camera.

The activation determination unit can cause a condition to shift from the sleep mode to the count mode at a fixed time interval.

The activation determination unit can cause a condition to shift from the sleep mode to the count mode on the basis of a number of feature points detected from the images photographed by the activation cameras in a state of the sleep mode.

The activation determination unit can cause a condition to shift from the sleep mode to the count mode on the basis of a proportion of a number of feature points detected from the images photographed by the activation cameras in a state of the sleep mode to a number of feature points serving as a reference.

The activation determination unit can cause a condition to shift from the sleep mode to the count mode on the basis of a result of the self-position estimation.

The activation determination unit can cause a condition to shift from the sleep mode to the count mode on the basis of a movement distance or an amount of rotation of the camera.

The activation determination unit can select the activation cameras on the basis of a positional relationship between a self-position obtained by the self-position estimation and a landmark shown by a three-dimensional map used for the self-position estimation.

The activation determination unit can select the activation cameras on the basis of an image obtained by a wide-angle camera capable of photographing an observation field of each of the plurality of cameras.

The plurality of cameras can be arranged on a spherical surface or on a circumference of a circle.

The control device can further include: a self-position estimation unit configured to perform the self-position estimation on the basis of the images photographed by the activation cameras.

A control method or a program according to an aspect of the present technology includes: a step of selecting some of a plurality of cameras as activation cameras to be used for self-position estimation; and a step of, on the basis of a selection result of the activation cameras, setting the cameras taken as the activation cameras among the plurality of cameras to an activation state and causing the cameras to photograph images, and suspending activation of the camera different from the activation cameras among the plurality of cameras.

According to an aspect of the present technology, some of a plurality of cameras are selected as activation cameras to be used for self-position estimation, and on the basis of a selection result of the activation cameras, the cameras taken as the activation cameras among the plurality of cameras are set to an activation state and the cameras are caused to photograph images, and activation of the camera different from the activation cameras among the plurality of cameras is suspended.

Advantageous Effects of Invention

According to an embodiment of the present technology, a self-position can be reliably estimated with lower power consumption.

Note that the effects described here are not necessarily limited, and any effect that is desired to be described in the present disclosure may be exhibited.

BRIEF DESCRIPTION OF DRAWINGS

FIG. 20 is a diagram showing an example of the configuration of a computer.

MODE(S) FOR CARRYING OUT THE INVENTION

Hereinbelow, embodiments to which the present technology is applied are described with reference to the drawings.
<First Embodiment>
<With Regard to Present Technology>

In the present technology, in a case where self-position estimation is performed using a plurality of cameras, more specifically a plurality of cameras or a camera set, the operation of some cameras is temporarily suspended as necessary, and thereby it is enabled to estimate the self-position reliably with sufficient accuracy while suppressing power consumption to a low level.

Figure 1:
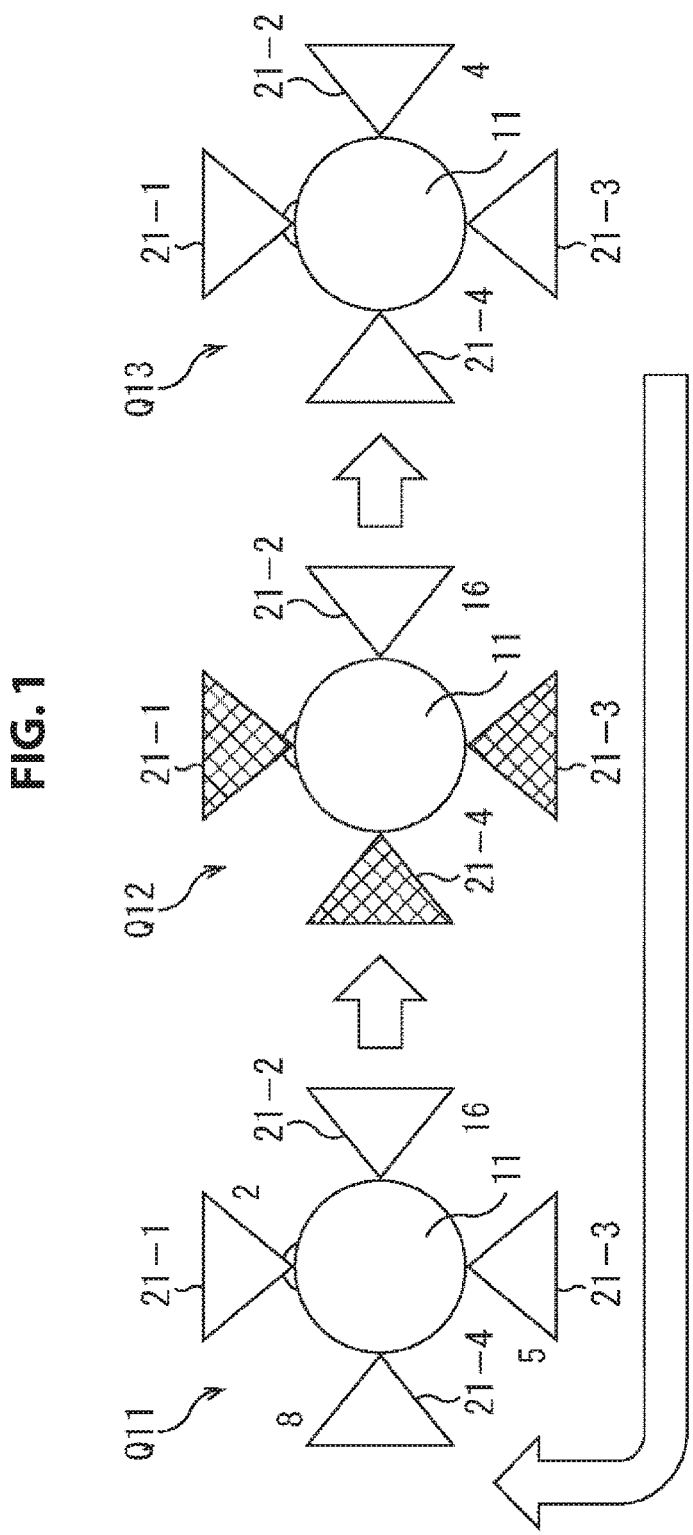
FIG. 1 is a diagram describing the present technology.

For example, as shown by arrow Q11 of FIG. 1, it is assumed that a user 11 who is the object of self-position estimation wears 4 cameras 21-1 to 21-4, and the self-position of the user 11 is estimated by using images photographed by the camera 21-1 to the camera 21-4.

In addition, hereinafter, in a case where there is no need to particularly distinguish the camera 21-1 to the camera 21-4, they may be referred to simply as a camera 21.

In this example, since each of the front, rear, left, and right directions of the user 11 is photographed by each of the cameras 21, all sides around the user 11 are observed by these 4 cameras 21. Therefore, a feature point can be detected from an image photographed by at least any one of the cameras 21, and the self-position of the user 11 (the camera 21) can be reliably estimated with sufficient accuracy.

However, as described above, in a case where self-position estimation is performed using n cameras 21, the power consumption of the cameras 21 is n times larger than in a case where self-position estimation is performed using one camera 21.

Thus, in the present technology, only some cameras 21 among a plurality of cameras 21 are activated and the activation of the other cameras 21 is temporarily suspended; thereby, it is enabled to estimate the self-position reliably with sufficient accuracy while suppressing the power consumption of the cameras 21 to a low level.

Specifically, in a state where all the cameras 21 are activated as shown by arrow Q11, an image (hereinafter, occasionally referred to as a photographing image) is photographed by each camera 21, and a camera 21 that is to be maintained in the activation state is selected on the basis of the obtained photographing images or the result of self-position estimation until now. That is, a camera 21 to be used for self-position estimation is selected.

Herein, for easier description, it is assumed that a camera 21 in which the number of feature points detected from the photographing image is largest is selected as a camera 21 to be maintained in the activation state.

It is assumed that, at this moment, 2 feature points are detected from the photographing image obtained in the camera 21-1, 16 feature points are detected from the photographing image obtained in the camera 21-2, and 5 feature points are detected from the photographing image obtained in the camera 21-3, as shown by arrow Q11. Further, it is assumed that 8 feature points are detected from the photographing image obtained in the camera 21-4.

In this case, the camera 21-2, in which the number of feature points detected from the photographing image is largest, is selected as a camera 21 to be maintained in the activation state, and the other cameras 21 are selected as a camera 21 to be set to a temporary activation-suspended state, that is, to a sleep state.

Then, in accordance with the selection, the activation state of the camera 21-2 is maintained, and the camera 21-1, the camera 21-3, and the camera 21-4 are set to the temporary activation-suspended state (the sleep state), as shown by arrow Q12. In this state, feature points are detected from a photographing image photographed by the camera 21-2, and the self-position of the user 11 is estimated on the basis of the detection result.

In addition, hereinafter, a state where, as shown by arrow Q11, all the cameras 21 are temporarily activated in order to decide a camera 21 to be set to the activation state may be referred to as a count mode. Further, hereinafter, a state where, as shown by arrow Q12, only some cameras 21 are activated and the activation of the other cameras 21 is temporarily suspended may be referred to as a sleep mode.

In this example, in a case of being in the sleep mode, the condition is in a state where only one camera 21 is activated, and therefore self-position estimation can be performed with power consumption substantially for the operation of one camera 21. Furthermore, in this case, among the 4 cameras 21, a camera 21 that can perform self-position estimation with the highest accuracy is set to the activation state; therefore, there is no case where a feature point is not detected from the photographing image or the accuracy of self-position estimation is reduced.

In the sleep mode in which self-position estimation is performed by one camera 21 in this way, the accuracy of self-position estimation in the activated camera 21 may be reduced due to the movement of the user 11 etc. That is, in this example, the number of feature points detected from the photographing image obtained in the activated camera 21 may be reduced.

Thus, in the present technology, at a predetermined timing, such as when the number of feature points detected from the photographing image has become a predetermined number or less, the camera 21 that has been set in the activation-suspended state (the sleep state) until now is returned to the activation state, and a camera 21 that is to be set to the activation state during the sleep mode is selected again, as shown by arrow Q13.

In other words, state transition is made from the sleep mode to the count mode, and all the cameras 21 are once set to the state of being activated. Then, again, a camera 21 to be activated during the sleep mode is selected, and the condition is shifted to the sleep mode again in accordance with the selection result.

Thus, the sleep mode and the count mode are switched at a predetermined timing; and during the sleep mode, self-position estimation is performed by only some cameras 21 among the plurality of cameras 21; thereby, the self-position can be reliably estimated with lower power consumption.

In addition, although herein an example in which the number of cameras 21 activated during the sleep mode is one is described, the number of activated cameras 21 may be one or a plural number. Further, the number of cameras 21 activated during the sleep mode may be variable.

Further, hereinafter, a camera 21 that is temporarily set to the activation-suspended state during the sleep mode may be particularly referred to as an activation suspension camera, and a camera 21 that is activated during the sleep mode may be referred to as an activation camera.

In a case where self-position estimation is performed by selectively activating only some cameras 21 among all the cameras 21 in the above way, there are some possible examples for the index for selecting the activation camera and the timing of shift from the sleep mode to the count mode.

<With Regard to Selection of Activation Camera>

As an index for selecting the activation camera, an index obtained from a photographing image photographed by each camera 21 in the state of the count mode and the like are possible. Specifically, as well as the number of feature points detected from the photographing image described above, the distribution of feature points on the photographing image or on the real space, the number of feature points on the photographing image corresponding to registered landmarks used for self-position estimation, and the like are possible, for example.

In a case where the user 11 wearing the camera 21 moves on the real space, it is expected that, the farther the position of a subject on the real space corresponding to a feature point detected from the photographing image is from the camera 21, the longer time thereafter the subject will be observed by the camera 21. That is, the feature point corresponding to that subject is expected to be detected also from a photographing image of a later frame.

Thus, as an example in which, for example, the activation camera is selected on the basis of the distribution of feature points on the real space, the feature point detected from the photographing image may be provided with a weight in accordance with the distance on the real space between the subject corresponding to the feature point and the camera 21, and a score in accordance with the number of feature points detected from the photographing image may be obtained with the weighting into account. In this case, the activation camera is selected on the basis of the score of each camera 21.

Thus, in this example, since a camera 21 in which a larger number of feature points are observed for a longer time is selected as the activation camera, the time up to the shift (transition) from the sleep mode to the next count mode can be made longer, and the self-position can be estimated with good efficiency.

Further, in a case where the activation camera is selected using the distribution of feature points on the photographing image as an index, the activation camera may be selected by dividing the photographing image into some regions in a grid form, counting the number of feature points in units of regions divided by the grid (hereinafter, referred to as divided regions), and using the counting result.

In general, the self-position can be estimated with higher accuracy if feature points are uniformly distributed over the entire photographing image; hence, a camera 21 in which feature points are equally detected over the entire photographing image, that is, over all the divided regions may be selected as the activation camera.

Further, the activation camera may be selected by, as well as dividing the photographing image into a grid, dividing the real space into a grid, counting, in units of divided spaces, the number of feature points detected from the photographing image, that is, the number of parts of subjects on the real space corresponding to feature points, and using the counting result.

Furthermore, there is known a method in which, on three-dimensional coordinates corresponding to the real space, the self-position is estimated from the corresponding relationships between landmarks registered in advance and landmarks successively registered, and feature points detected from a photographing image, such as simultaneous localization and mapping (SLAM), for example. In a case where self-position estimation is performed by such a method, the activation camera may be selected on the basis of the positional relationships between landmarks and the self-position at the current time.

Here, the landmark is a part of a subject on the real space in which a feature point is detected from the photographing image or a feature point can be detected from the photographing image; and during self-position estimation, a three-dimensional map that shows information indicating the position of each landmark, that is, the position information of the landmark in a three-dimensional coordinate system is used.

Specifically, for example, the corresponding relationships between feature points detected from photographing images at different photographing times are obtained, and the self-position of the user 11 (the camera 21) is obtained by estimation from the corresponding relationships between these feature points, the corresponding relationships between the feature points and the landmarks, etc.

In this case, the region in the real space to be observed by each camera 21, that is, the photographing direction of each camera 21 can be identified from the current self-position and the angle of view of the camera 21. Further, the number of landmarks to be observed by each camera 21, that is, the number of feature points corresponding to landmarks to be detected from the photographing image can be estimated from the photographing direction of each camera 21 and the position of each landmark shown on the three-dimensional map.

Thus, from the positional relationships between the current self-position and landmarks shown on the three-dimensional map, a camera 21 by which the largest number of landmarks are observed may be selected as the activation camera. Thereby, a camera 21 by which a larger number of feature points corresponding to landmarks will be detected and the self-position can be estimated with higher accuracy can be selected as the activation camera. In this case, when selecting the activation camera, there is no particular need to detect a feature point from a photographing image; therefore, there is no need to shift from the sleep mode to the count mode. That is, operation can be performed always in the state of the sleep mode, while the activation camera is switched as necessary.

Further, in a case where the self-position is estimated using a three-dimensional map, it is possible to detect feature points from a photographing image and identify, among the detected feature points, feature points corresponding to registered landmarks, and to take, as the activation camera, a camera 21 in which the number of feature points corresponding to landmarks included in the photographing image is largest. In this case, it is necessary to shift to the count mode in order to select the activation camera.

<With Regard to Shift from Sleep Mode to Count Mode>

Furthermore, the following examples are possible as the timing of shift from the sleep mode to the count mode.

For example, the condition may be shifted from the sleep mode to the count mode every time a fixed time elapses. In this case, for the measurement of the fixed time, a timestamp that indicates the photographing time of the photographing image may be used, or a counter or the lime may be used.

Further, for example, the condition may be shifted from the sleep mode to the count mode at a tracking point during self-position estimation, that is, at the timing at which the number, proportion, or the like of feature points corresponding to landmarks that are detected from the photographing image obtained in the state of being in the sleep mode becomes a certain value or less.

For example, in a case of using the proportion of feature points corresponding to landmarks, the proportion of the number of feature points corresponding to landmarks obtained by the photographing image of the current frame to the number of feature points corresponding to landmarks obtained by the photographing image of a frame serving as a reference is compared to a predefined value.

In addition, the condition may be shifted from the sleep mode to the count mode at the timing at which, as well as the number or proportion of feature points corresponding to landmarks, the number, proportion, or the like of feature points that are detected from the photographing image obtained by the activation camera during the state of the sleep mode is decreasing relative to the number or proportion of feature points detected from the photographing image of a frame serving as a reference.

Further, the condition may be shifted from the sleep mode to the count mode on the basis of the estimation result of the self-position. In such a case, for example, the condition may shift to the count mode in a case where the amount of movement (the movement distance) of the user 11 from the self-position at a time serving as a reference such as the frame of a specific photographing image has exceeded a certain amount. In addition, in this case, the amount of movement of the user 11 may be the amount of movement on the photographing image, or may be the amount of movement on the real space.

Furthermore, the condition may be shifted from the sleep mode to the count mode when, using a sensor such as a gyro sensor capable of measuring the amount of movement of the user 11, it is found that the amount of movement of the user 11 has become a certain value or more. Similarly, the condition may be shifted from the sleep mode to the count mode when, using a sensor such as a global positioning system (GPS) sensor capable of measuring the position on the real space of the user 11, it is found that the movement distance from a predetermined position of the user 11 has become a certain value or more.

<Example of Configuration of Self-position Estimation System>

Figure 2:
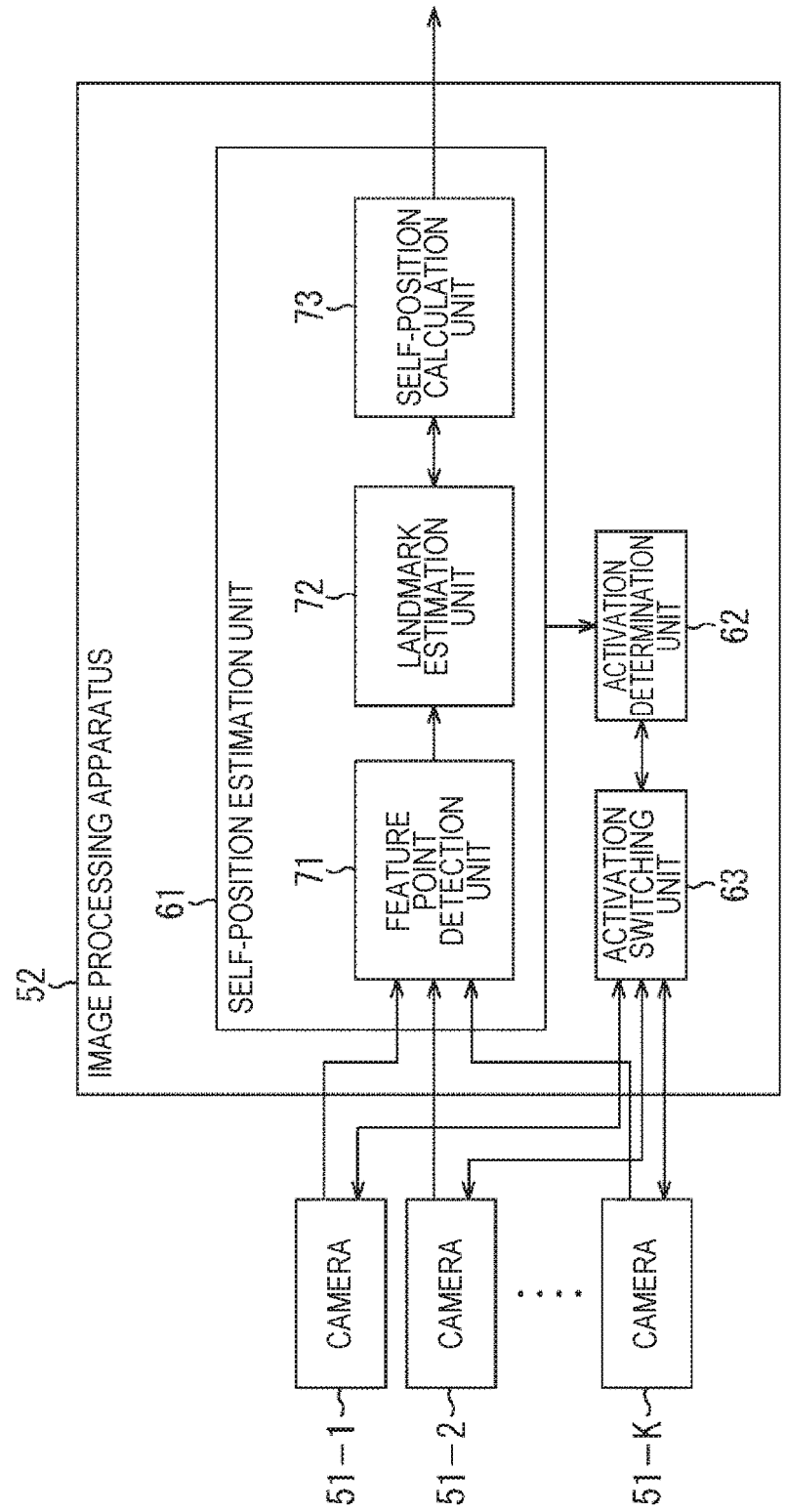
FIG. 2 is a diagram showing an example of the configuration of a self-position estimation system.

Next, a more specific embodiment to which the present technology is applied is described. FIG. 2 is a diagram showing an example of the configuration of an embodiment of a self-position estimation system to which the present technology is applied.

The self-position estimation system shown in FIG. 2 includes a camera 51-1 to a camera 51-K and an image processing apparatus 52. In addition, although herein an example in which the self-position estimation system estimates the self-position using a three-dimensional map is described, the self-position may be estimated by any other method.

The camera 51-1 to the camera 51-K are a camera corresponding to the camera 21 shown in FIG. 1, and are attached to the object of self-position estimation such as a user. In addition, hereinafter, in a case where there is no need to particularly distinguish the camera 51-1 to the camera 51-K, they may be referred to simply as a camera 51. Further, herein it is assumed that the object of self-position estimation is, for example, a user who wears a wearable device composed of the camera 51 and the image processing apparatus 52.

The cameras 51 are arranged such that the entire surrounding area or substantially the entire surrounding area on the real space of the user who is the object of self-position estimation can be observed by the cameras 51; for example, they are arranged at equal intervals on a spherical surface or on the circumference of a circle. Further, each camera 51 is connected to the image processing apparatus 52 via wire or wirelessly.

The camera 51 photographs the surrounding area of the user as the subject, and supplies the resulting photographing image to the image processing apparatus 52. Further, in accordance with the instruction of the image processing apparatus 52, the camera 51 enters the activation-suspended state (the sleep state) or returns from the activation-suspended state to the activation state.

In addition, the camera 51 may be a monocular camera, or may be a camera set such as a stereo camera composed of two cameras, i.e., a left and a right camera. In the following, the description is continued on the assumption that the camera 51 is a stereo camera composed of a left camera and a right camera. In particular, in the following, the photographing image obtained by the left camera constituting the camera 51 may be referred to as a left photographing image, and the photographing image obtained by the right camera constituting the camera 51 may be referred to as a right photographing image.

The image processing apparatus 52 controls each camera 51 to set the camera 51 to the activation-suspended state or the activation state, estimates the self-position of the user on the basis of the photographing image supplied from the camera 51, and outputs the estimation result.

The image processing apparatus 52 includes a self-position estimation unit 61, an activation determination unit 62, and an activation switching unit 63.

The self-position estimation unit 61 estimates the self-position of the user on the basis of the photographing image supplied from the camera 51. The self-position estimation unit 61 includes a feature point detection unit 71, a landmark estimation unit 72, and a self-position calculation unit 73.

The feature point detection unit 71 detects a feature point from the photographing image supplied from the camera 51, and supplies the detection result to the landmark estimation unit 72.

The landmark estimation unit 72 updates a three-dimensional map on the basis of the detection result of feature points supplied from the feature point detection unit 71, with reference to the estimation result of the self-position obtained by the self-position calculation unit 73. Further, the landmark estimation unit 72 supplies the updated three-dimensional map and the detection result of feature points supplied from the feature point detection unit 71 to the self-position calculation unit 73.

The self-position calculation unit 73 calculates the self-position of the user by estimation on the basis of the three-dimensional map and the detection result of feature points supplied from the landmark estimation unit 72, and outputs the calculation result to a block in a later stage.

Further, the self-position estimation unit 61 supplies to the activation determination unit 62 various pieces of information such as the detection result of feature points, the positions of landmarks shown by the three-dimensional map, and the estimation result of the self-position, as necessary.

On the basis of the information supplied from the self-position estimation unit 61, the activation determination unit 62 causes the state of the self-position estimation system to transition (shift) to the count mode or the sleep mode. Further, on the basis of the information supplied from the self-position estimation unit 61, at the timing at which the condition shifts to the count mode, the activation determination unit 62 selects the activation camera to be used for self-position estimation, and supplies the selection result to the activation switching unit 63.

The activation switching unit 63 controls the activation and operation of the camera 51 on the basis of the selection result of the activation camera supplied from the activation determination unit 62 and an instruction to activate the camera 51. That is, the activation switching unit 63 sets the camera 51 to the activation state and causes the camera 51 to photograph a photographing image, or causes the camera 51 to sleep (activation suspension).

The activation determination unit 62 and the activation switching unit 63 provided in the image processing apparatus 52 function as a control device that selects the activation camera to be used for self-position estimation and controls the activation of the camera 51 on the basis of the selection result. In addition, although herein a configuration in which the activation determination unit 62 and the activation switching unit 63, and the self-position estimation unit 61 are provided in the image processing apparatus 52 is shown, the activation determination unit 62 and the activation switching unit 63, and the self-position estimation unit 61 may be provided in different apparatuses.

<Description of Self-position Estimation Processing>

Subsequently, operations of the self-position estimation system shown in FIG. 2 are described.

If the self-position estimation system is instructed to start the estimation of the self-position of the user, the self-position estimation system performs self-position estimation processing, and outputs the estimation result of the self-position of the user. Hereinafter, self-position estimation processing by the self-position estimation system is described with reference to the flow chart of FIG. 3.

In step S11, the activation determination unit 62 determines whether the condition is in the sleep mode or not on the basis of the activation state of the camera 51.

In a case where in step S11 it is determined that the condition is in the sleep mode, the processing goes to step S12.

In step S12, the activation determination unit 62 determines whether the difference $t-t_k$ between a timestamp t that indicates the photographing time of a photographing image to be obtained by the camera 51 and a reference timestamp $t_k$ that indicates a time serving as a reference that it holds is less than a predetermined threshold α or not, that is, whether $t-t_k<\alpha$ or not.

The activation determination unit 62 holds, as the reference timestamp $t_k$, the timestamp t of the photographing image at the time when the condition shifted (transitioned) from the count mode to the sleep mode for the last time.

In the processing of step S12, the activation determination unit 62 acquires a timestamp t indicating the current time from the camera 51 via the activation switching unit 63, and compares the acquired timestamp t and the reference timestamp $t_k$ that it holds to determine whether $t-t_k<\alpha$ or not.

Thus, in this processing, it is determined whether or not the predetermined time α has elapsed from when the condition shifted from the count mode to the sleep mode, that is, the condition entered the sleep mode for the last time.

In addition, although herein an example in which whether or not a predetermined time has elapsed from when the condition entered the sleep mode is specified using the timestamp t of the photographing image is described, as well as this example, the activation determination unit 62 itself may keep the time, or may acquire other time information. For example, the activation determination unit 62 may start the counting of time at the time point when the condition has entered the sleep mode, and specify whether a predetermined time has elapsed or not.

In a case where in step S12 it is determined that $t-t_k<\alpha$ does not hold, that is, the predetermined time has elapsed from when the condition entered the sleep mode, the activation determination unit 62 instructs the activation switching unit 63 to activate all the cameras 51, and the processing goes to step S13.

In step S13, the activation switching unit 63 activates all the cameras 51 in accordance with the instruction of the activation determination unit 62. Thereby, the camera 51 that has been in the sleep state until now reverts, and the condition enters a state where all the cameras 51 are activated. Then, each camera 51 photographs the surrounding subject, and supplies the resulting photographing image to the feature point detection unit 71.

In step S14, the activation determination unit 62 shifts the state of the self-position estimation system from the sleep mode to the count mode. Then, after that, the processing returns to step S11, and the processing described above is performed repeatedly.

On the other hand, in a case where in step S12 it is determined that $t-t_k<\alpha$, that is, the predetermined time has not yet elapsed from when the condition entered the sleep mode, in step S15 the activation determination unit 62 maintains the state of the sleep mode.

In this case, self-position estimation in the sleep mode is continuously performed. If the processing of step S15 is performed, after that, the processing goes to step S25.

Further, in a case where in step S11 it is determined that the condition is not in the sleep mode, that is, in a case where the condition is in the count mode, the processing goes to step S16.

In step S16, the activation determination unit 62 sets the value of a counter i that indicates the number of cameras 51 processed as the processing object to the counter i=0. That is, the value of the counter i is reset to 0. Here, it is assumed that the value of the counter i is used also as a camera index that specifies a camera 51 of the processing object. For example, a camera 51 that is taken as the processing object in the state of the counter i=0 is defined as a camera 51 with a camera index i=0.

In step S17, the activation determination unit 62 determines whether processing has been performed for all the cameras 51 or not. For example, in the example shown in FIG. 2, the number of cameras 51 is K; therefore, in a case where the value of the counter i is less than K, that is, in a case where i<K, it is determined that processing has not yet been performed on all the cameras 51 as the processing object.

In a case where in step S17 it is determined that processing has not been performed for all the cameras 51, the processing goes to step S18.

In step S18, the feature point detection unit 71 detects feature points from a photographing image supplied from a camera 51 of the processing object specified by the counter i, that is, the value of the camera index i. Here, the photographing image taken as the object for feature point detection in step S18 is a photographing image photographed by a camera 51 of the processing object in the state of the count mode.

In this example, since the camera 51 is a stereo camera, a left photographing image and a right photographing image are supplied as the photographing image from the camera 51 of the processing object to the feature point detection unit 71. The feature point detection unit 71 detects feature points from either one of the left photographing image and the right photographing image supplied from the camera 51 of the processing object by, for example, a corner detection algorithm such as Harris corner detection or scale-invariant feature transform (SIFT).

In step S19, the activation determination unit 62 compares the number of feature points n that indicates the number of feature points detected from the photographing image, more specifically, either one of the left photographing image and the right photographing image obtained by the camera 51 of the processing object and the number of feature points $n_{max}$ that is the maximum value among the numbers of feature points n obtained for the cameras 51 that have been taken as the processing object until now, and determines whether $n>n_{max}$ or not. That is, it is determined whether or not the number of feature points n obtained for the camera 51 of the processing object is larger than the number of feature points $n_{max}$ that is the maximum value among the numbers of feature points n that have been obtained until now after the condition entered the count mode for the last time.

Further, it is assumed that the activation determination unit 62 holds the value of the counter i at the time when the number of feature points $n_{max}$ is obtained, as the value of a camera index $i_{max}$ that specifies a camera 51 in which the number of feature points $n_{max}$ is obtained. In addition, the values of the number of feature points $n_{max}$ and the camera index $i_{max}$ are reset at the timing at which the counter i is reset.

In a case where in step S19 it is determined that $n>n_{max}$ does not hold, the processing of step S20 is skipped, and the processing goes to step S21.

In contrast, in a case where in step S19 it is determined that $n>n_{max}$, in step S20 the activation determination unit 62 sets $n_{max}=n$, and $i_{max}=i$.

That is, the activation determination unit 62 updates the number of feature points $n_{max}$ so that the value of the number of feature points $n_{max}$ that it holds is the value of the number of feature points n obtained for the camera 51 of the processing object. Further, the activation determination unit 62 updates the camera index $i_{max}$ so that the value of the camera index $i_{max}$ that it holds is the camera index i indicating the camera 51 of the processing object, that is, the value of the counter i at the current time point.

If such processing is performed for all the cameras 51, the value of the camera index $i_{max}$ at this time point is the value of a camera index i that indicates a camera 51 in which the number of feature points detected from the photographing image is largest at the current time point.

Similarly, the value of the number of feature points $n_{max}$ is the value of the number of feature points n obtained for a camera 51 indicated by the camera index $i_{max}$, that is, the maximum value among the numbers of feature points detected from the photographing images at the current time point.

If in step S20 the number of feature points $n_{max}$ and the camera index $i_{max}$ are updated, after that, the processing goes to step S21.

If in step S20 the number of feature points $n_{max}$ and the camera index $i_{max}$ have been updated or in step S19 it is determined that $n>n_{max}$ does not hold, in step S21 the activation determination unit 62 increments the value of the counter i that it holds by 1. Then, after that, the processing returns to step S17, and the processing described above is performed repeatedly.

Further, in a case where in step S17 it is determined that processing has been performed for all the cameras 51, that is, in a case where the counter i≥K and the definitive number of feature points $n_{max}$ and the definitive camera index $i_{max}$ are obtained, the processing goes to step S22.

In step S22, the activation determination unit 62 shifts the state of the self-position estimation system from the count mode to the sleep mode.

Then, in step S23, the activation determination unit 62 sets the reference timestamp $t_k$=the timestamp t.

That is, the activation determination unit 62 acquires a timestamp t indicating the current time from the camera 51 via the activation switching unit 63, and updates the reference timestamp $t_k$ so that the value of the reference timestamp $t_k$ that it holds is the value of the newly acquired timestamp t. Thereby, the timestamp t at the time point when the condition has shifted from the count mode to the sleep mode is taken as the new reference timestamp $t_k$.

Further, if the condition has entered the sleep mode, the activation determination unit 62 selects the camera 51 indicated by the camera index $i_{max}$ as the activation camera that is to be activated during the sleep mode, and supplies the selection result to the activation switching unit 63.

In step S24, the activation switching unit 63 controls each camera 51 on the basis of the selection result of the activation camera supplied from the activation determination unit 62, and keeps only the camera 51 indicated by the camera index $i_{max}$ activated and on the other hand temporarily suspends the activation of the other cameras 51. Further, the activation switching unit 63 controls the camera 51 taken as the activation camera and causes the camera 51 to photograph a photographing image.

By such processing, feature points are detected from photographing images photographed during the state of the count mode; consequently, one camera 51 in which the largest number of feature points have been detected, that is, a camera 51 that will be able to estimate the self-position more reliably with the highest accuracy is taken as the activation camera, and the other cameras 51 are taken as the activation suspension camera. Thereby, while the self-position is reliably estimated with sufficient accuracy by the activation camera, the activation of the other cameras 51 is suspended; thereby, power consumption can be suppressed to a low level.

If in step S24 the activation control of the camera 51 is performed in accordance with the selection result of the activation camera, after that, the processing goes to step S25.

If in step S24 the activation control of the camera 51 has been performed or in step S15 the sleep mode is maintained, in step S25 the camera 51 taken as the activation camera photographs the surrounding subject, and supplies the resulting photographing image to the feature point detection unit 71. In this event, the activation suspension camera does not perform photographing, and is in the activation-suspended state.

In step S26, the feature point detection unit 71 detects feature points from the left photographing image and the right photographing image that are supplied as the photographing image from the camera 51 taken as the activation camera by, for example, a corner detection algorithm such as Harris corner detection or SIFT, and supplies the detection result to the landmark estimation unit 72.

In step S27, the landmark estimation unit 72 performs landmark estimation on the basis of the result of self-position estimation performed for the last time, the result of feature point detection for the photographing image used for that self-position estimation, and the interocular distance of the camera 51 (the length of the baseline).

Specifically, for example, the landmark estimation unit 72 acquires the result of self-position estimation performed for the last time and the result of feature point detection at that time from the self-position calculation unit 73. Then, on the basis of the result of feature point detection for the photographing image used for self-position estimation performed for the last time, the landmark estimation unit 72 performs parallax matching that obtains the corresponding relationship between the feature point on the left photographing image and the feature point on the right photographing image.

In the parallax matching, the parallax of a feature point on the photographing image is obtained from the positional relationship between mutually corresponding feature points, that is, a feature point on the left photographing image and a feature point on the right photographing image extracted from the same part of the subject. Here, the feature point for which the parallax is obtained is a feature point corresponding to each landmark shown on the three-dimensional map that the landmark estimation unit 72 holds.

The landmark estimation unit 72 obtains the position of a landmark on the real space (the three-dimensional coordinate system) from the parallax of the feature point corresponding to the landmark thus obtained, the interocular distance that is the distance between the left camera and the right camera constituting the camera 51, and the result of self-position estimation performed for the last time. Then, on the basis of the position of the landmark obtained, the landmark estimation unit 72 updates the three-dimensional map that it holds.

In addition, in the updating of the three-dimensional map performed here, only the result of self-position estimation performed for the last time and the result of feature point detection at that time are used, and the result of feature point detection from the newest photographing image obtained by the processing of the immediately preceding step S26 is not used. Hence, the processing of landmark estimation performed in step S27 may be executed at the time point when self-position estimation is performed for the last time.

The landmark estimation unit 72 supplies the three-dimensional map thus updated and the detection result of feature points supplied from the feature point detection unit 71 as the result of step S26 of this time to the self-position calculation unit 73.

In step S28, the self-position calculation unit 73 performs self-position estimation on the basis of the detection result of feature points and the three-dimensional map supplied from the landmark estimation unit 72, and the result of self-position estimation performed for the last time.

For example, the self-position calculation unit 73 decides a matching range used at the time of performing self-position estimation this time, on the basis of the amount of movement of a feature point on the photographing image at the time when self-position estimation was performed for the last time, or the amount of movement of the camera 51 on the real space at that time.

Specifically, when searching, from the photographing image obtained this time, a feature point corresponding to a feature point corresponding to a landmark on the photographing image obtained last time, the self-position calculation unit 73 decides, as the matching range, a region that is to be searched on the photographing image, that is, a region where the corresponding feature point will be present, on the basis of the amount of movement of the feature point at the time when self-position estimation was performed last time.

On the basis of the detection result of feature points supplied from the landmark estimation unit 72, the self-position calculation unit 73 performs matching processing that, with the matching range of the photographing image obtained this time as the object, obtains the corresponding relationship between the feature point included in the matching range and the feature point detected from the photographing image at the time when self-position estimation was performed last time. Thereby, the corresponding relationship between the feature point corresponding to the landmark on the photographing image obtained last time and the feature point on the photographing image obtained this time that is extracted from the same part as the above feature point is obtained. In addition, matching processing may be performed only on either one of the left photographing image and the right photographing image, or may be performed for both photographing images.

On the basis of the corresponding relationship between feature points corresponding to a landmark thus obtained and the position of each landmark shown by the updated three-dimensional map, the self-position calculation unit 73 calculates the position and posture of the user at the current time as the self-position.

Here, the position and posture of the user are the position of the user and the direction in which the user is facing on the real space, that is, the three-dimensional coordinate system. More specifically, the direction in which the user is facing, that is, the posture of the user is expressed by, for example, the yaw angle, the roll angle, and the pitch angle of the user's head.

If the self-position of the user at the current time is thus obtained as the result of self-position estimation, the self-position calculation unit 73 outputs the result of self-position estimation to a later stage. Then, after that, the processing returns to step S11, and the processing described above is performed repeatedly. Further, if it is instructed that the estimation of the self-position of the user be finished, the self-position estimation processing finishes.

In the above manner, if a predetermined time has elapsed from when the condition entered the sleep mode, the self-position estimation system shifts to the count mode and selects the activation camera again, and shifts to the sleep mode again. By selecting the activation camera again at fixed time intervals and shifting the condition to the sleep mode again in this way, self-position estimation can be performed with lower power consumption.

In particular, by selecting the activation camera again at fixed time intervals and selecting, as the activation camera, a camera 51 that can detect the largest number of feature points, the self-position can be reliably estimated with sufficient accuracy even with small power consumption.

In addition, although herein a description is given using, as an example, a case where the camera 51 is a stereo camera, the method of self-position estimation performed on the basis of the photographing image obtained by the camera 51 may be any method. For example, it is possible for the camera 51 to be a monocular camera, and even in such a case self-position estimation can be performed in the self-position estimation unit 61 by SLAM or the like.

During self-position estimation, for example, the self-position estimation unit 61 estimates an approximate self-position of the user at the current time on the basis of the amount of movement of the user on the real space (the three-dimensional coordinate system) at the time when self-position estimation was performed for the last time, and obtains a matching range on the photographing image.

Then, with the matching range in the photographing image obtained this time as the object, the self-position estimation unit 61 obtains the corresponding relationship between a feature point present in the matching range and a feature point corresponding to a landmark in the photographing image obtained last time by matching processing. By the matching processing, the amount of movement of the feature point corresponding to the landmark on the photographing image is obtained.

Furthermore, from the amount of movement on the photographing image of the feature point corresponding to the landmark and the self-position shown by the result of the last self-position estimation, the self-position estimation unit 61 calculates the definitive self-position at the current time and the position of the landmark in the real space. In this event, the self-position estimation unit 61 updates the three-dimensional map on the basis of the position of the landmark obtained, as appropriate.

<Modification Example 1 of First Embodiment>
<Description of Self-position Estimation Processing>

Further, although in the above an example in which one camera 51 is selected as the activation camera that is to be activated in the sleep mode is described, one or a plurality of cameras 51 may be selected as the activation camera.

Hereinafter, self-position estimation processing performed by the self-position estimation system in such a case is described with reference to the flow chart of FIG. 4. In addition, the processing of step S51 to step S58 is similar to the processing of step S11 to step S18 of FIG. 3, and therefore a description thereof is omitted.

If feature points are detected from the photographing image in step S58, in step S59 the activation determination unit 62 compares the number of feature points n obtained for the camera 51 of the processing object and a predefined threshold $n_{th}$, and determines whether $n > n_{th}$ or not.

Here, as the threshold $n_{th}$, for example, the number of feature points necessary to perform self-position estimation with sufficient accuracy or the like is used. Thus, it can be said that a camera 51 in which a larger number than the threshold $n_{th}$ of feature points are detected from the photographing image is a camera 51 that can perform self-position estimation with sufficient accuracy, that is, a camera 51 that is to be taken as the activation camera.

Thus, in a case where in step S59 it is determined that $n > n_{th}$, the activation determination unit 62 selects the camera 51 of the processing object as the activation camera, and supplies the selection result to the activation switching unit 63; and the processing goes to step S60.

In addition, although herein a camera 51 in which the number of feature points is larger than the threshold is taken as the activation camera, as well as this, among the cameras 51 in which the number of feature points is larger than the threshold, a predefined number of cameras 51 chosen in descending order of the number of feature points may be selected as the activation camera, for example.

In step S60, on the basis of the selection result of the activation camera supplied from the activation determination unit 62, the activation switching unit 63 activates the camera 51 of the processing object; and the processing goes to step S62. That is, the condition is set in a state where the camera 51 of the processing object is kept activated.

In contrast, in a case where in step S59 it is found that $n > n_{th}$ does not hold, that is, the number of feature points n obtained for the camera 51 of the processing object is not more than the threshold $n_{th}$, the activation determination unit 62 selects the camera 51 of the processing object as the activation suspension camera, and supplies the selection result to the activation switching unit 63; and the processing goes to step S61.

In step S61, the activation switching unit 63 temporarily suspends the activation of the camera 51 of the processing object on the basis of the selection result of the activation suspension camera supplied from the activation determination unit 62, and the processing goes to step S62. That is, the camera 51 of the processing object is set to the sleep state.

If in step S60 the camera 51 is activated or in step S61 the activation of the camera 51 is suspended, in step S62 the activation determination unit 62 increments the value of the counter i that it holds by 1. Then, after that, the processing returns to step S57, and the processing described above is performed repeatedly.

Further, in a case where in step S57 it is determined that processing has been performed for all the cameras 51, in step S63 the activation determination unit 62 shifts the state of the self-position estimation system from the count mode to the sleep mode.

Then, in step S64, the activation determination unit 62 sets the reference timestamp $t_k$=the timestamp t. That is, in step S64, processing similar to step S23 of FIG. 3 is performed, and the reference timestamp $t_k$ is updated.

If in step S64 the reference timestamp $t_k$ has been updated or in step S55 the sleep mode is maintained, after that, the processing of step S65 to step S68 is performed and the processing returns to step S51, and the processing described above is performed repeatedly. Further, if it is instructed that the estimation of the self-position of the user be finished, the self-position estimation processing finishes.

Figure 3:
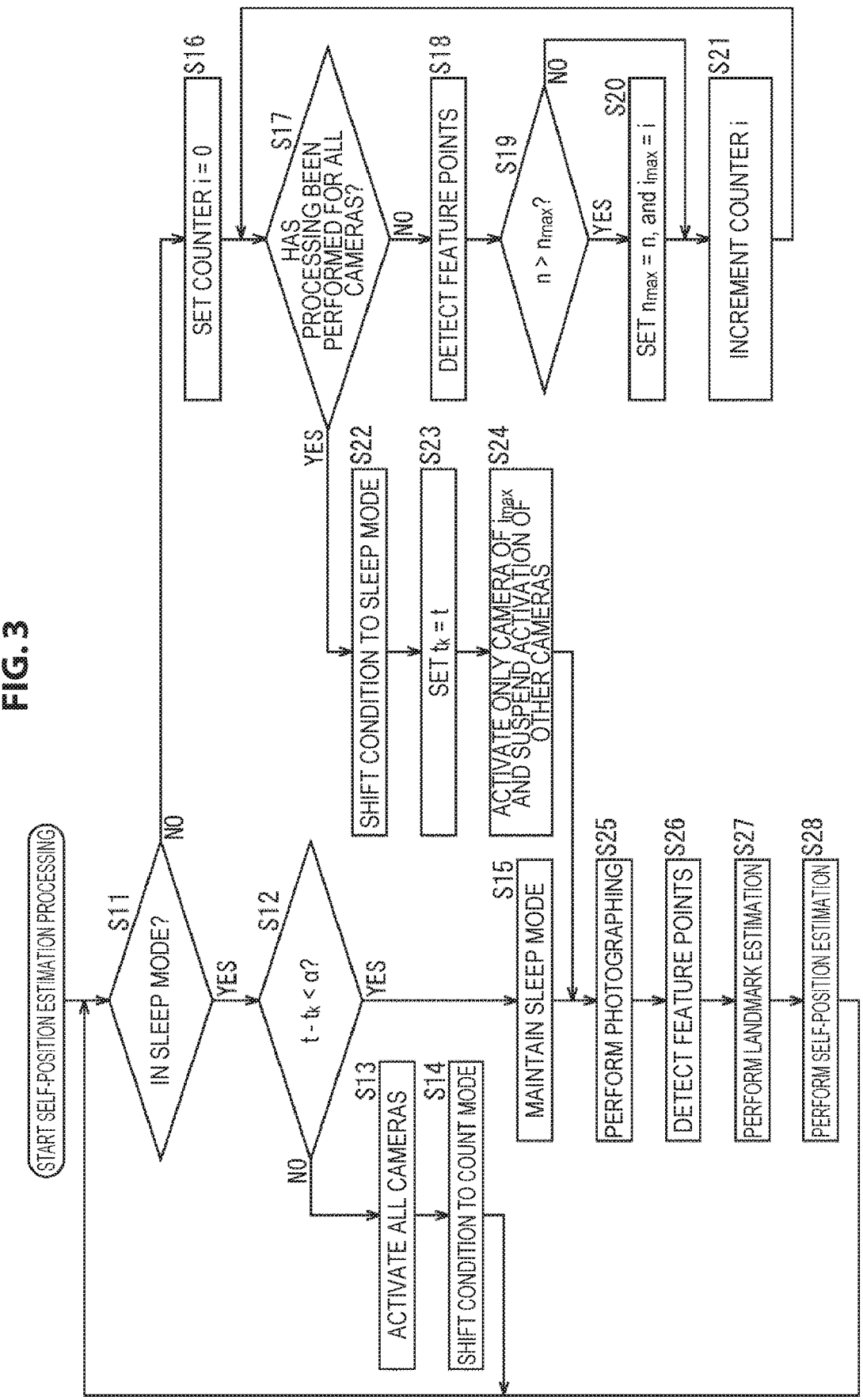
FIG. 3 is a flow chart describing self-position estimation processing.
Figure 4:
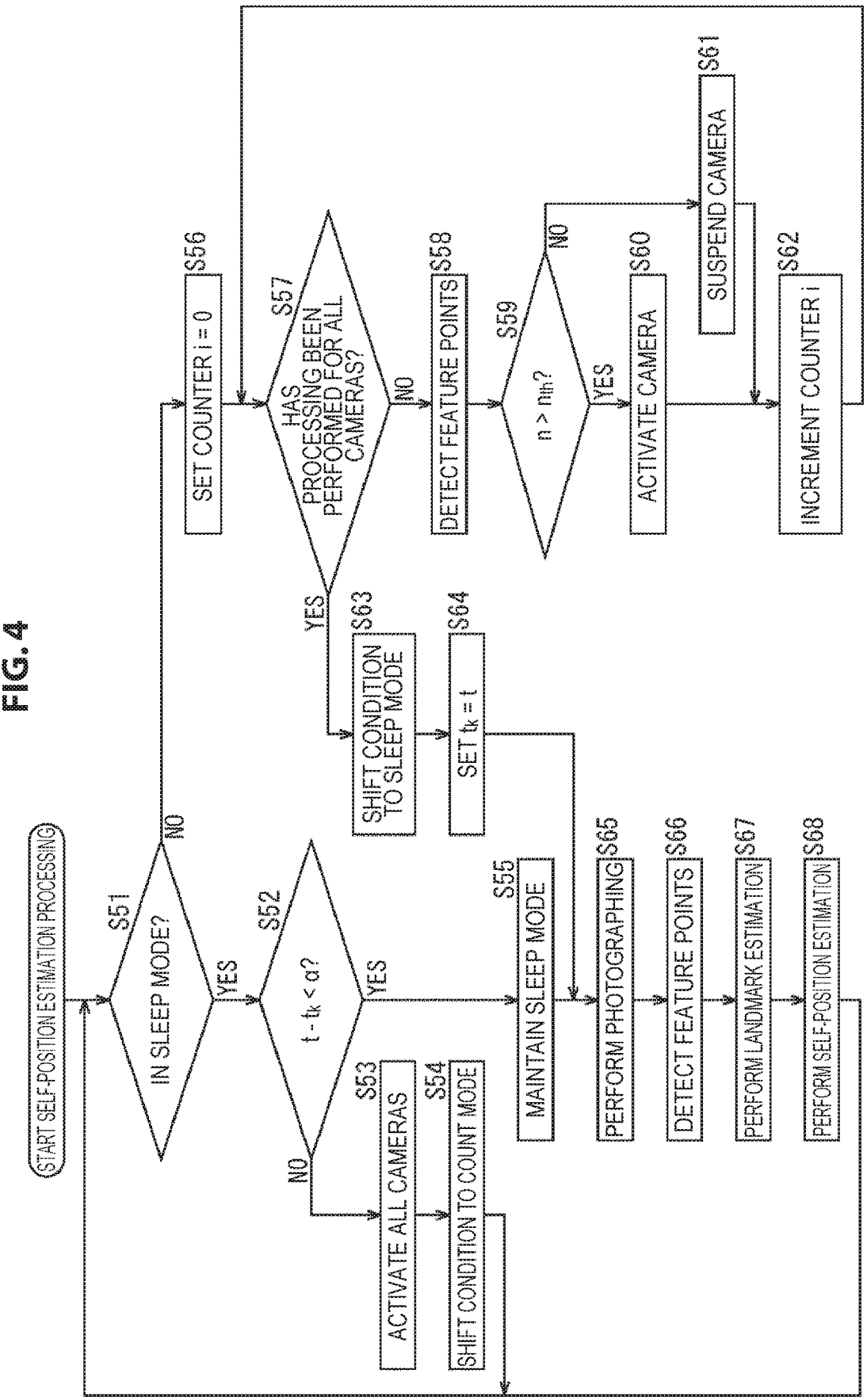
FIG. 4 is a flow chart describing self-position estimation processing.

In addition, the processing of step S65 to step S68 is similar to the processing of step S25 to step S28 of FIG. 3, and therefore a description thereof is omitted.

However, in this example, there may be a plurality of activation cameras, and the result of self-position estimation is obtained for each of the cameras 51 taken as the activation camera. In this case, the self-position calculation unit 73 takes, as the definitive self-position, one self-position obtained on the basis of these self-positions, such as the average value of the self-positions obtained for these cameras 51, for example. Further, instead of calculating the definitive self-position after obtaining the self-position for each activation camera, it is possible to integrate the calculation results in the activation cameras to one in the course of self-position calculation.

In the above way, if a predetermined time has elapsed from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at fixed time intervals and selecting, as the activation camera, a camera 51 that can detect a larger number than the threshold of feature points, the self-position can be reliably estimated with sufficient accuracy even with small power consumption.

<Modification Example 2 of First Embodiment>
<Description of Self-position Estimation Processing>

Further, although in the above an example in which the activation camera is selected on the basis of the number of feature points detected from the photographing image is described, one camera 51 in which a larger number of feature points are uniformly detected from the entire photographing image may be selected as the activation camera.

Figure 5:
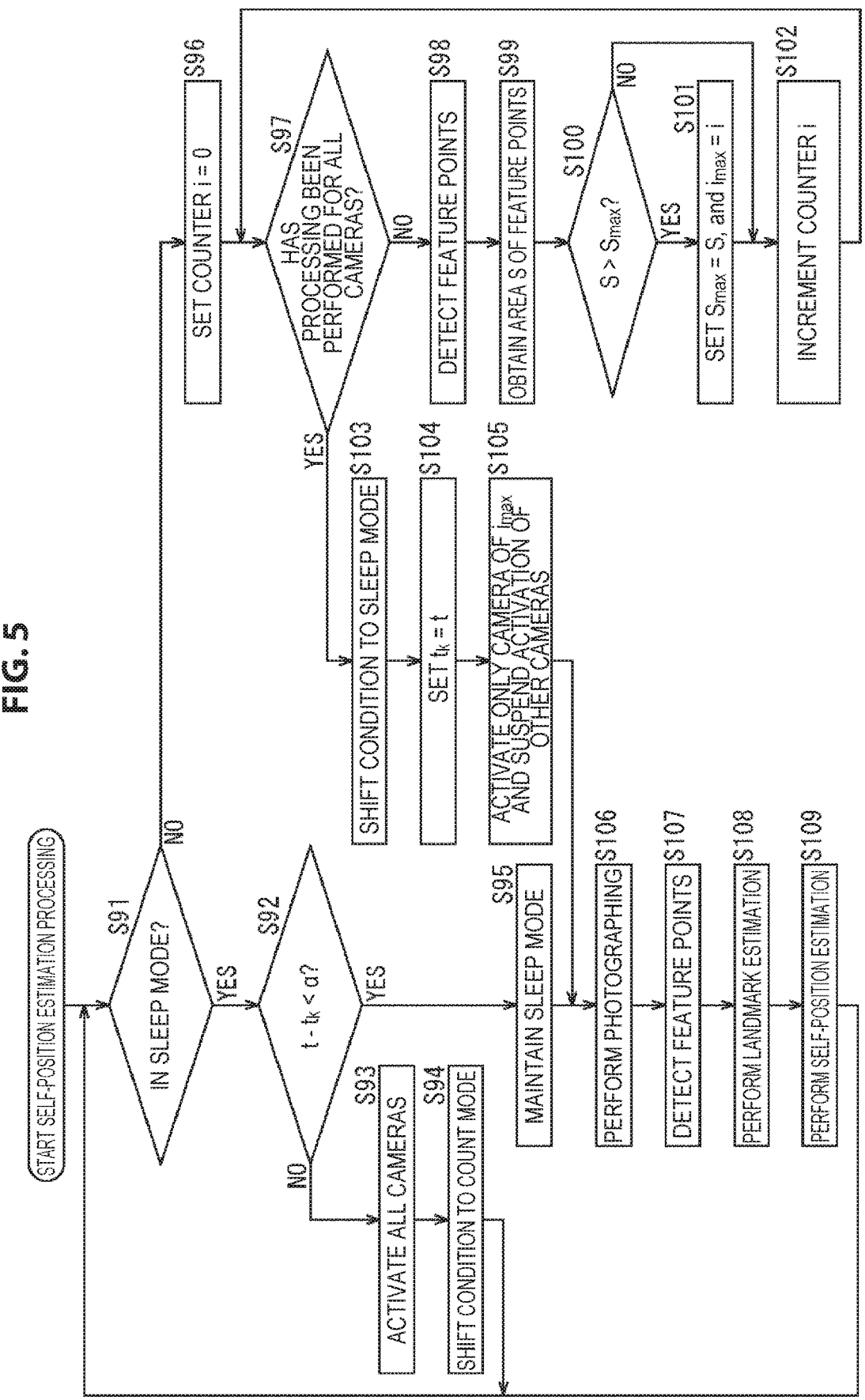
FIG. 5 is a flow chart describing self-position estimation processing.

Hereinafter, self-position estimation processing performed by the self-position estimation system in such a case is described with reference to the flow chart of FIG. 5. In addition, the processing of step S91 to step S98 is similar to the processing of step S11 to step S18 of FIG. 3, and therefore a description thereof is omitted.

In step S99, the activation determination unit 62 acquires the detection result of feature points in step S98 from the feature point detection unit 71, and the area S of feature points is obtained on the basis of the detection result.

For example, for the photographing image obtained by the camera 51 of the processing object, the activation determination unit 62 sets, as a feature region, a rectangular region of a predetermined size with a feature point detected from the photographing image as the center. Furthermore, for each pair of feature points, the activation determination unit 62 calculates the area of the portion where the two feature regions overlap, and subtracts the sum total of the calculated areas from the sum total of the areas of the feature regions of all the feature points; and takes the obtained value as the area S of feature points.

The area S of feature points thus obtained is the larger, the larger the number of feature points detected from the photographing image is. Further, the more uniformly feature points are detected from the regions of the photographing image, the smaller the regions where feature regions overlap are, and consequently the larger the area S of feature points is.

Thus, it can be said that a camera 51 with the largest area S of feature points among a plurality of cameras 51 is a camera 51 in which a larger number of feature points are uniformly detected from the entire photographing image and that is most suitable for use in self-position estimation.

It can be said that selecting the activation camera on the basis of the area S of feature points in this way is selecting the activation camera on the basis of the distribution of feature points on the photographing image obtained in the state of the count mode.

In step S100, the activation determination unit 62 compares the area S of feature points obtained for the camera 51 of the processing object and the area $S_{max}$ of feature points that is the maximum value among the areas S of feature points obtained for the cameras 51 that have been taken as the processing object until now after the condition entered the count mode for the last time, and determines whether $S>S_{max}$ or not. That is, it is determined whether or not the area S of feature points obtained for the camera 51 of the processing object is larger than the area $S_{max}$ of feature points that is the maximum value among the areas S of feature points that have been obtained until now.

Further, it is assumed that the activation determination unit 62 holds the value of the counter i at the time when the area $S_{max}$ of feature points is obtained, as the value of a camera index $i_{max}$ that specifies a camera 51 in which the area $S_{max}$ of feature points is obtained.

In a case where in step S100 it is determined that $S>S_{max}$ does not hold, the processing of step S101 is skipped, and the processing goes to step S102.

In contrast, in a case where in step S100 it is determined that $S>S_{max}$, in step S101 the activation determination unit 62 sets $S_{max}$=S, and $i_{max}$=i.

That is, the activation determination unit 62 updates the area $S_{max}$ of feature points so that the value of the area $S_{max}$ of feature points that it holds is the value of the area S of feature points obtained for the camera 51 of the processing object. Further, the activation determination unit 62 updates the camera index $i_{max}$ so that the value of the camera index $i_{max}$ that it holds is the camera index i indicating the camera 51 of the processing object, that is, the value of the counter i at the current time point.

If such processing is performed for all the cameras 51, the value of the camera index $i_{max}$ at this time point is the value of a camera index i that indicates a camera 51 in which the area S of feature points is largest at the current time point.

Similarly, the value of the area $S_{max}$ of feature points is the value of the area S of feature points obtained for a camera 51 indicated by the camera index $i_{max}$, that is, the maximum value of the area S of feature points at the current time point.

If in step S101 the area $S_{max}$ of feature points and the camera index $i_{max}$ are updated, after that, the processing goes to step S102.

If in step S101 the area $S_{max}$ of feature points and the camera index $i_{max}$ have been updated or in step S100 it is determined that $S>S_{max}$ does not hold, in step S102 the activation determination unit 62 increments the value of the counter i that it holds by 1. Then, after that, the processing returns to step S97, and the processing described above is performed repeatedly.

Further, in a case where in step S97 it is determined that processing has been performed for all the cameras 51, in step S103 the activation determination unit 62 shifts the state of the self-position estimation system from the count mode to the sleep mode.

Then, in step S104, the activation determination unit 62 sets the reference timestamp $t_k$=the timestamp t. That is, in step S104, processing similar to step S23 of FIG. 3 is performed, and the reference timestamp $t_k$ is updated.

Further, if the condition has entered the sleep mode, the activation determination unit 62 selects the camera 51 indicated by the camera index $i_{max}$ as the activation camera that is to be activated during the sleep mode, and supplies the selection result to the activation switching unit 63.

In step S105, on the basis of the selection result of the activation camera supplied from the activation determination unit 62, the activation switching unit 63 keeps only the camera 51 indicated by the camera index $i_{max}$ activated, and on the other hand temporarily suspends the activation of the other cameras 51.

By such processing, a camera 51 most suitable for self-position estimation is taken as the activation camera, and the other cameras 51 are taken as the activation suspension camera. As a result, while the self-position is reliably estimated with sufficient accuracy by the activation camera, the activation of the other cameras 51 is suspended; thereby, power consumption can be suppressed to a low level.

If in step S105 the activation control of the camera 51 has been performed or in step S95 the sleep mode is maintained, after that, the processing of step S106 to step S109 is performed and the processing returns to step S91, and the processing described above is performed repeatedly. Further, if it is instructed that the estimation of the self-position of the user be finished, the self-position estimation processing finishes.

In addition, the processing of step S106 to step S109 is similar to the processing of step S25 to step S28 of FIG. 3, and therefore a description thereof is omitted.

In the above manner, if a predetermined time has elapsed from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at fixed time intervals and selecting, as the activation camera, a camera 51 that can detect the largest number of feature points uniformly, the self-position can be reliably estimated with sufficient accuracy even with small power consumption.

<Modification Example 3 of First Embodiment>
<Description of Self-position Estimation Processing>

Further, when selecting the activation camera, a camera 51 that can observe the largest number of landmarks may be taken as the activation camera.

Figure 6:
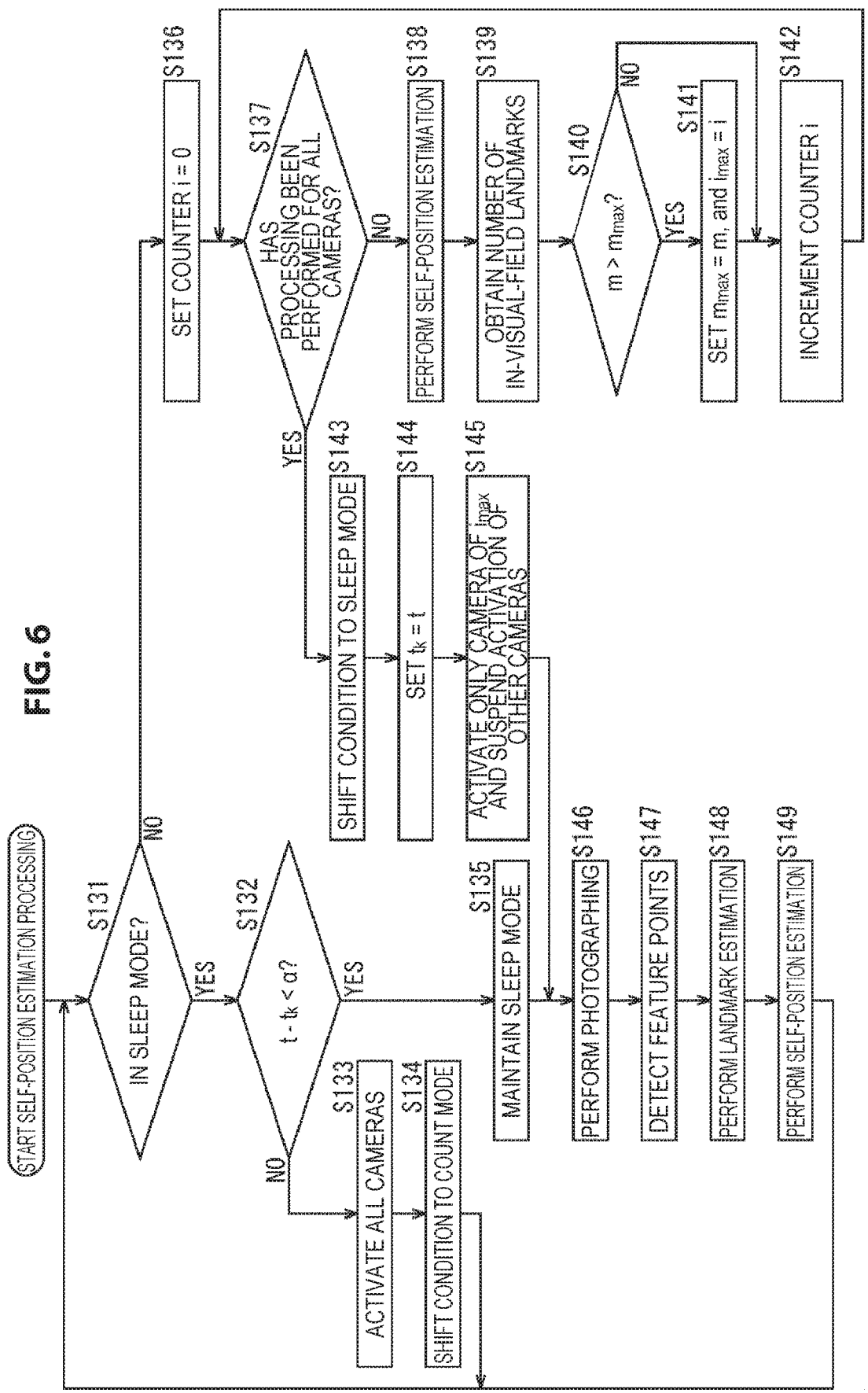
FIG. 6 is a flow chart describing self-position estimation processing.

Hereinafter, self-position estimation processing performed by the self-position estimation system in such a case is described with reference to the flow chart of FIG. 6. In addition, the processing of step S131 to step S137 is similar to the processing of step S11 to step S17 of FIG. 3, and therefore a description thereof is omitted.

In a case where in step S137 it is determined that processing has not been performed on all the cameras 51, the processing goes to step S138.

In step S138, the self-position estimation unit 61 performs self-position estimation on the basis of the photographing image supplied from the camera 51 of the processing object specified by the counter i, that is, the value of the camera index i. This photographing image is a photographing image obtained by being photographed in the state of the count mode.

For example, the feature point detection unit 71 of the self-position estimation unit 61 detects feature points from the photographing image supplied from the camera 51 of the processing object, and supplies the detection result to the self-position calculation unit 73 via the landmark estimation unit 72. Further, the landmark estimation unit 72 performs processing similar to the processing of step S27 of FIG. 3 as necessary, and updates the three-dimensional map that it holds.

On the basis of the detection result of feature points from the photographing image at the time when self-position estimation was performed for the last time and the detection result of feature points for the photographing image obtained by the camera 51 of the camera index i which has been supplied from the landmark estimation unit 72, the self-position calculation unit 73 obtains the corresponding relationship between feature points detected from these photographing images.

Then, on the basis of the corresponding relationship between feature points thus obtained and the updated three-dimensional map, the self-position calculation unit 73 calculates the position and posture of the user at the current time as the self-position.

In step S139, on the basis of the self-position at the current time obtained by the processing of step S138 and the three-dimensional map, the self-position calculation unit 73 obtains, as the number of in-visual-field landmarks m, the number of landmarks observed in the photographing image obtained by the camera 51 of the processing object of the camera index i. That is, the number of feature points that correspond to landmarks shown in the three-dimensional map and that are included in the photographing image is taken as the number of in-visual-field landmarks m.

The self-position estimation unit 61 supplies the number of in-visual-field landmarks m thus obtained to the activation determination unit 62.

In general, it is expected that, the larger the number of in-visual-field landmarks m obtained for a camera 51 is, the higher accuracy and the more reliability the self-position can be estimated with if self-position estimation is performed using the camera 51. Thus, in the activation determination unit 62, processing is performed so that a camera 51 in which the number of in-visual-field landmarks m is largest is selected as the activation camera.

In step S140, the activation determination unit 62 compares the number of in-visual-field landmarks m supplied from the self-position estimation unit 61 and the number of in-visual-field landmarks $m_{max}$ that is the maximum value among the numbers of in-visual-field landmarks m obtained for the cameras 51 that have been taken as the processing object until now after the condition entered the count mode for the last time, and determines whether $m > m_{max}$ or not. That is, it is determined whether or not the number of in-visual-field landmarks m obtained for the camera 51 of the processing object is larger than the number of in-visual-field landmarks $m_{max}$ that is the maximum value among the numbers of in-visual-field landmarks m that have been obtained until now.

Further, it is assumed that the activation determination unit 62 holds the value of the counter i at the time when the number of in-visual-field landmarks $m_{max}$ is obtained, as the value of a camera index $i_{max}$ that specifies a camera 51 in which the number of in-visual-field landmarks $m_{max}$ is obtained.

In a case where in step S140 it is determined that $m > m_{max}$ does not hold, the processing of step S141 is skipped, and the processing goes to step S142.

In contrast, in a case where in step S140 it is determined that $m > m_{max}$, in step S141 the activation determination unit 62 sets $m_{max} = m$, and $i_{max} = i$.

That is, the activation determination unit 62 updates the number of in-visual-field landmarks $m_{max}$ so that the value of the number of in-visual-field landmarks $m_{max}$ that it holds is the value of the number of in-visual-field landmarks m obtained for the camera 51 of the processing object. Further, the activation determination unit 62 updates the camera index $i_{max}$ so that the value of the camera index $i_{max}$ that it holds is the camera index i indicating the camera 51 of the processing object, that is, the value of the counter i at the current time point.

If such processing is performed for all the cameras 51, the value of the camera index $i_{max}$ at this time point is the value of a camera index i that indicates a camera 51 in which the number of in-visual-field landmarks m is largest at the current time point.

Similarly, the value of the number of in-visual-field landmarks $m_{max}$ is the value of the number of in-visual-field landmarks m obtained for a camera 51 indicated by the camera index $i_{max}$, that is, the maximum value of the number of in-visual-field landmarks m at the current time point.

If in step S141 the number of in-visual-field landmarks $m_{max}$ and the camera index $i_{max}$ are updated, after that, the processing goes to step S142.

If in step S141 the number of in-visual-field landmarks $m_{max}$ and the camera index max have been updated or in step S140 it is determined that $m > m_{max}$ does not hold, in step S142 the activation determination unit 62 increments the value of the counter i that it holds by 1. Then, after that, the processing returns to step S137, and the processing described above is performed repeatedly.

Further, if in step S137 it is determined that processing has been performed for all the cameras 51, after that, the processing of step S143 to step S145 is performed, and a camera 51 in which the number of in-visual-field landmarks m is largest is selected as the activation camera. In addition, the processing of step S143 to step S145 is similar to the processing of step S22 to step S24 of FIG. 3, and therefore a description thereof is omitted.

Furthermore, if in step S145 the activation control of the camera 51 has been performed or in step S135 the sleep mode is maintained, the processing of step S146 to step S149 is performed and the processing returns to step S131, and the processing described above is performed repeatedly. Further, if it is instructed that the estimation of the self-position of the user be finished, the self-position estimation processing finishes.

In addition, the processing of step S146 to step S149 is similar to the processing of step S25 to step S28 of FIG. 3, and therefore a description thereof is omitted.

In the above manner, if a predetermined time has elapsed from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at fixed time intervals and selecting, as the activation camera, a camera 51 that can observe the largest number of landmarks, the self-position can be reliably estimated with sufficient accuracy even with small power consumption.

<Second Embodiment>
<Description of Self-position Estimation Processing>

Furthermore, although in the above an example in which the condition shifts from the sleep mode to the count mode if a fixed time has elapsed is described, the condition may be shifted to the count mode at the timing at which the self-position of the user (the camera 51) moves a predetermined distance or more from a position serving as a reference.

Figure 7:
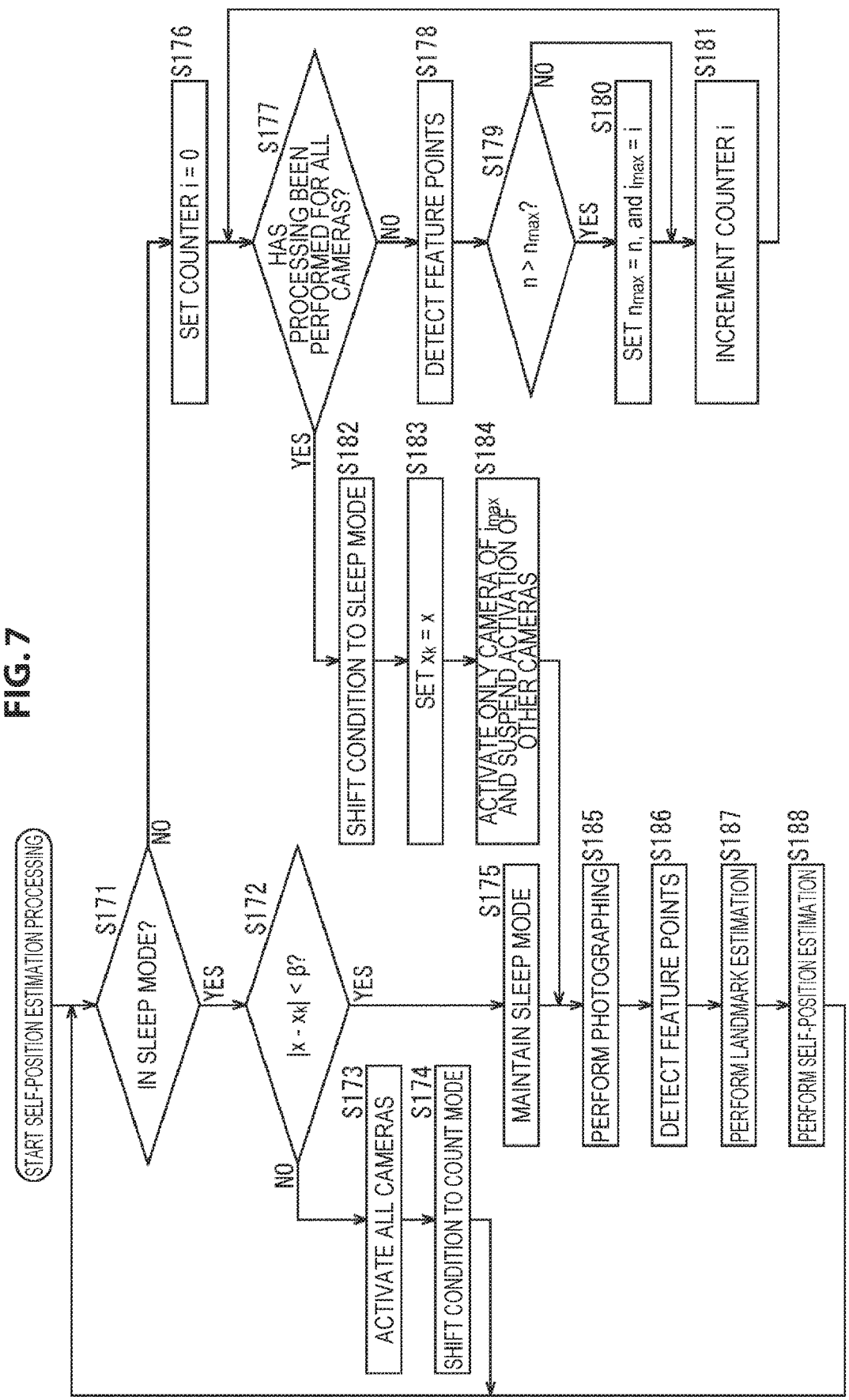
FIG. 7 is a flow chart describing self-position estimation processing.

Hereinafter, self-position estimation processing performed by the self-position estimation system in such a case is described with reference to the flow chart of FIG. 7. In addition, the processing of step S171 is similar to the processing of step S11 of FIG. 3, and therefore a description thereof is omitted.

In a case where in step S171 it is determined that the condition is in the sleep mode, the activation determination unit 62 acquires, as a self-position x, the calculation result of the self-position at the current time from the self-position calculation unit 73 of the self-position estimation unit 61, and the processing goes to step S172.

In step S172, the activation determination unit 62 determines whether the distance $|x-x_k|$ between the self-position x at the current time acquired and a reference self-position $x_k$ that is a self-position serving as a reference that it holds is less than a predetermined threshold β or not, that is, whether $|x-x_k|<\beta$ or not.

The activation determination unit 62 holds, as the reference self-position $x_k$, the self-position x of the user at the time when the condition shifted (transitioned) from the count mode to the sleep mode for the last time.

In the processing of step S172, it is determined whether the distance $|x-x_k|$ from the reference self-position $x_k$ on the real space (the three-dimensional coordinate system) to the self-position x is less than the threshold β or not. Thus, in this processing, it is determined whether or not the self-position of the user has moved the predetermined distance β or more from when the condition shifted from the count mode to the sleep mode, that is, entered the sleep mode for the last time.

In addition, although herein an example in which the determination of whether to shift to the count mode or not is performed on the basis of the movement distance of the self-position on the real space is described, as well as this, the determination may be performed on the basis of the movement distance of a feature point corresponding to a landmark on the photographing image. Further, the determination may be performed on the basis of the amount of change of the posture of the user.

In a case where in step S172 it is determined that $|x-x_k|<\beta$ does not hold, that is, the self-position has changed by the predetermined distance β or more from when the condition entered the sleep mode, the activation determination unit 62 instructs the activation switching unit 63 to activate all the cameras 51, and the processing goes to step S173.

Then, after that, the processing of step S173 and step S174 is performed and the processing returns to step S171, and the processing described above is performed repeatedly. In addition, the processing of step S173 and step S174 is similar to the processing of step S13 and step S14 of FIG. 3, and therefore a description thereof is omitted.

Further, in a case where in step S172 it is determined that $|x-x_k|<\beta$, that is, the self-position has not moved the predetermined distance β or more from when the condition entered the sleep mode, in step S175 the activation determination unit 62 maintains the state of the sleep mode.

If the state of the sleep mode is maintained, after that, the processing goes to step S185.

Further, in a case where in step S171 it is determined that the condition is not in the sleep mode, that is, in a case where the condition is in the count mode, the processing goes to step S176.

Then, the processing of step S176 to step S182 is performed; these pieces of processing are similar to the processing of step S16 to step S22 of FIG. 3, and therefore a description thereof is omitted.

In step S183, the activation determination unit 62 sets the reference self-position $x_k$=the self-position x at the current time.

That is, the activation determination unit 62 updates the reference self-position $x_k$ so that the reference self-position $x_k$ that it holds is the self-position x at the current time. Thereby, the self-position at the time point when the condition has shifted from the count mode to the sleep mode is taken as the new reference self-position $x_k$.

If the reference self-position $x_k$ is updated, after that, the processing of step S184 is performed, and the processing goes to step S185; the processing of step S184 is similar to the processing of step S24 of FIG. 3, and therefore a description thereof is omitted.

If in step S184 the activation control of the camera 51 has been performed or in step S175 the sleep mode is maintained, the processing of step S185 to step S188 is performed and the processing returns to step S171, and the processing described above is performed repeatedly. Further, if it is instructed that the estimation of the self-position of the user be finished, the self-position estimation processing finishes.

In addition, the processing of step S185 to step S188 is similar to the processing of step S25 to step S28 of FIG. 3, and therefore a description thereof is omitted.

In the above manner, if the self-position has moved a predetermined distance or more from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the self-position moves a predetermined distance or more and selecting, as the activation camera, a camera 51 that can detect the largest number of feature points, the self-position can be reliably estimated with sufficient accuracy even with small power consumption.

<Modification Example 1 of Second Embodiment>
<Description of Self-position Estimation Processing>

Further, also in a case where the determination of whether to shift to the count mode or not is performed on the basis of the movement distance of the self-position, one or a plurality of cameras 51 may be selected as the activation camera as described with reference to FIG. 4.

Figure 8:
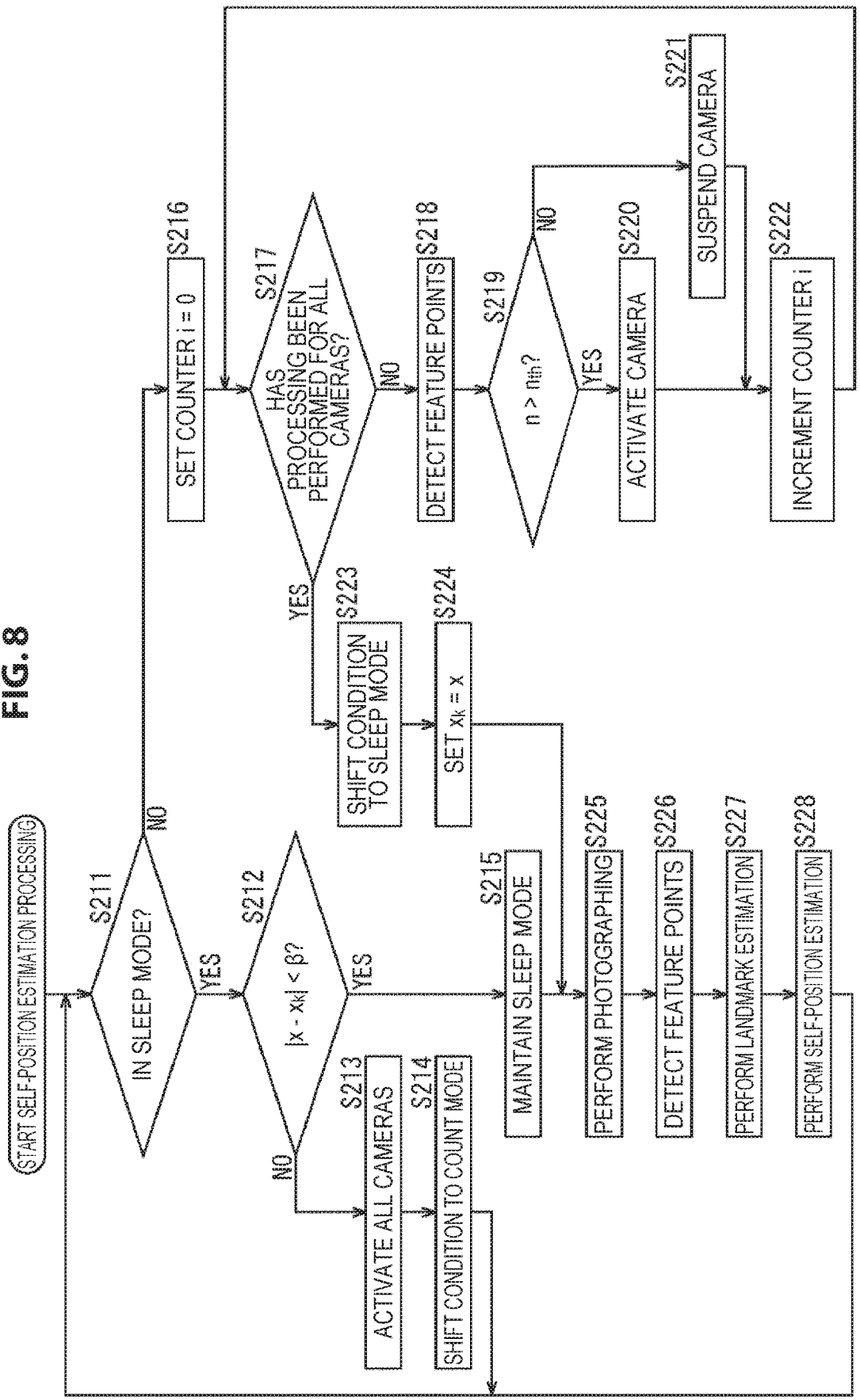
FIG. 8 is a flow chart describing self-position estimation processing.

Hereinafter, self-position estimation processing performed by the self-position estimation system in such a case is described with reference to the flow chart of FIG. 8. In addition, the processing of step S211 to step S218 is similar to the processing of step S171 to step S178 of FIG. 7, and therefore a description thereof is omitted.

Further, if in step S218 feature points are detected, after that, the processing of step S219 to step S223 is performed, and a camera 51 in which the number of feature points n is larger than a threshold $n_{th}$ is selected as the activation camera. In addition, the processing of step S219 to step S223 is similar to the processing of step S59 to step S63 of FIG. 4, and therefore a description thereof is omitted.

In step S224, the activation determination unit 62 sets the reference self-position $x_k$=the self-position x at the current time. In step S224, processing similar to step S183 of FIG. 7 is performed.

If in step S224 the reference self-position $x_k$ has been updated or in step S215 the sleep mode is maintained, the processing of step S225 to step S228 is performed and the processing returns to step S211, and the processing described above is performed repeatedly. Further, if it is instructed that the estimation of the self-position of the user be finished, the self-position estimation processing finishes.

In addition, the processing of step S225 to step S228 is similar to the processing of step S25 to step S28 of FIG. 3, and therefore a description thereof is omitted.

In the above manner, if the self-position has moved a predetermined distance or more from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the self-position moves a predetermined distance or more and selecting, as the activation camera, a camera 51 that can detect a larger number than the threshold of feature points, the self-position can be reliably estimated with sufficient accuracy even with small power consumption.

<Modification Example 2 of Second Embodiment>
<Description of Self-position Estimation Processing>

Further, also in a case where the determination of whether to shift to the count mode or not is performed on the basis of the movement distance of the self-position, the activation camera may be selected on the basis of the area S of feature points as described with reference to FIG. 5.

Figure 9:
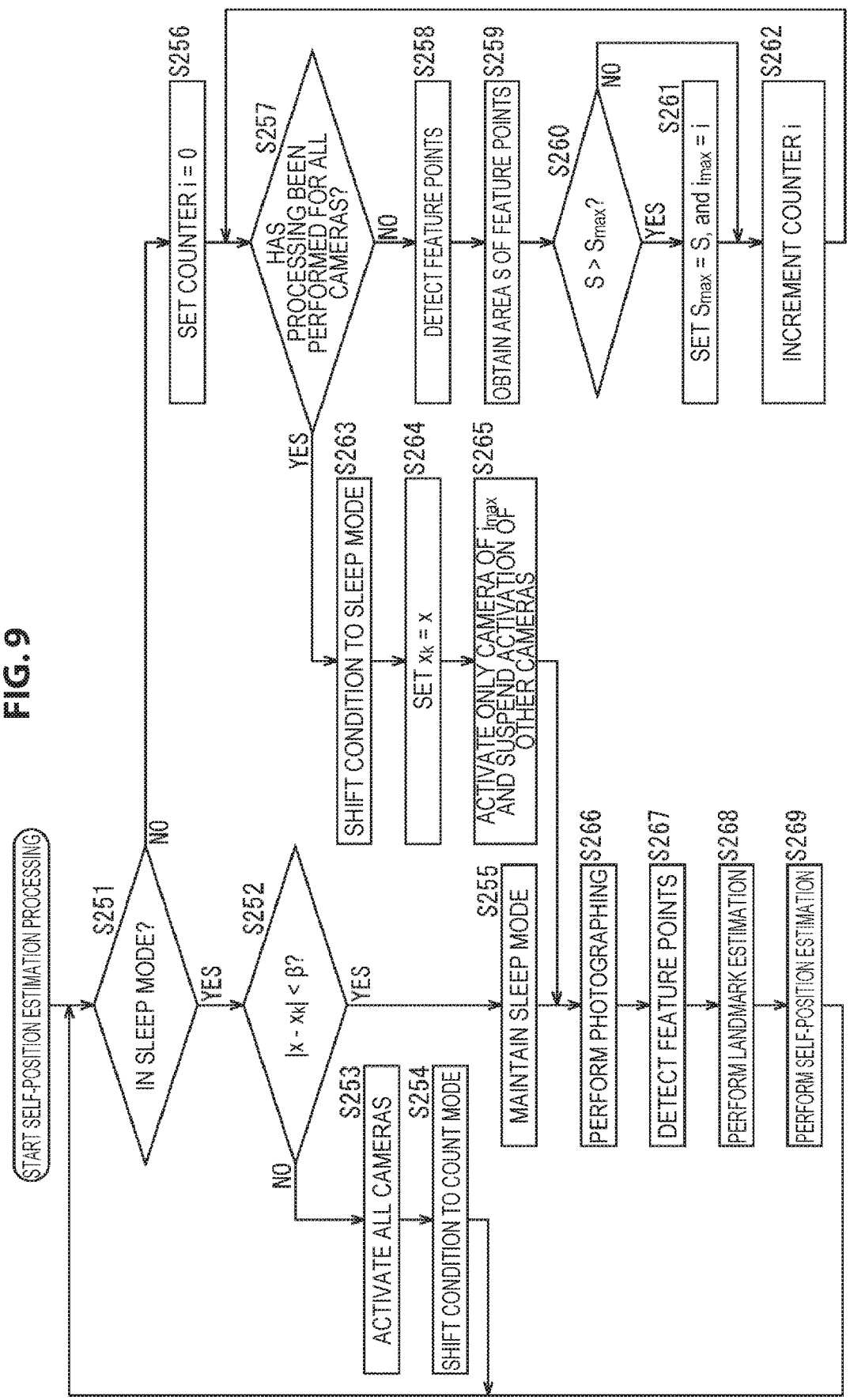
FIG. 9 is a flow chart describing self-position estimation processing.

Hereinafter, self-position estimation processing performed by the self-position estimation system in such a case is described with reference to the flow chart of FIG. 9. In addition, the processing of step S251 to step S258 is similar to the processing of step S171 to step S178 of FIG. 7, and therefore a description thereof is omitted.

Further, if in step S258 feature points are detected, after that, the processing of step S259 to step S263 is performed, and a camera 51 in which the area S of feature points is largest is selected as the activation camera. In addition, the processing of step S259 to step S263 is similar to the processing of step S99 to step S103 of FIG. 5, and therefore a description thereof is omitted.

In step S264, the activation determination unit 62 sets the reference self-position $x_k$=the self-position x at the current time. In step S264, processing similar to step S183 of FIG. 7 is performed.

If the reference self-position $x_k$ is updated, after that, the processing of step S265 is performed, and the processing goes to step S266; the processing of step S265 is similar to the processing of step S24 of FIG. 3, and therefore a description thereof is omitted.

If in step S265 the activation control of the camera 51 has been performed or in step S255 the sleep mode is maintained, the processing of step S266 to step S269 is performed and the processing returns to step S251, and the processing described above is performed repeatedly. Further, if it is instructed that the estimation of the self-position of the user be finished, the self-position estimation processing finishes.

In addition, the processing of step S266 to step S269 is similar to the processing of step S25 to step S28 of FIG. 3, and therefore a description thereof is omitted.

In the above manner, if the self-position has moved a predetermined distance or more from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the self-position moves a predetermined distance or more and selecting, as the activation camera, a camera 51 that can detect the largest number of feature points uniformly, the self-position can be reliably estimated with sufficient accuracy even with small power consumption.

<Modification Example 3 of Second Embodiment>
<Description of Self-position Estimation Processing>

Further, also in a case where the determination of whether to shift to the count mode or not is performed on the basis of the movement distance of the self-position, the activation camera may be selected on the basis of the number of in-visual-field landmarks m as described with reference to FIG. 6.

Figure 10:
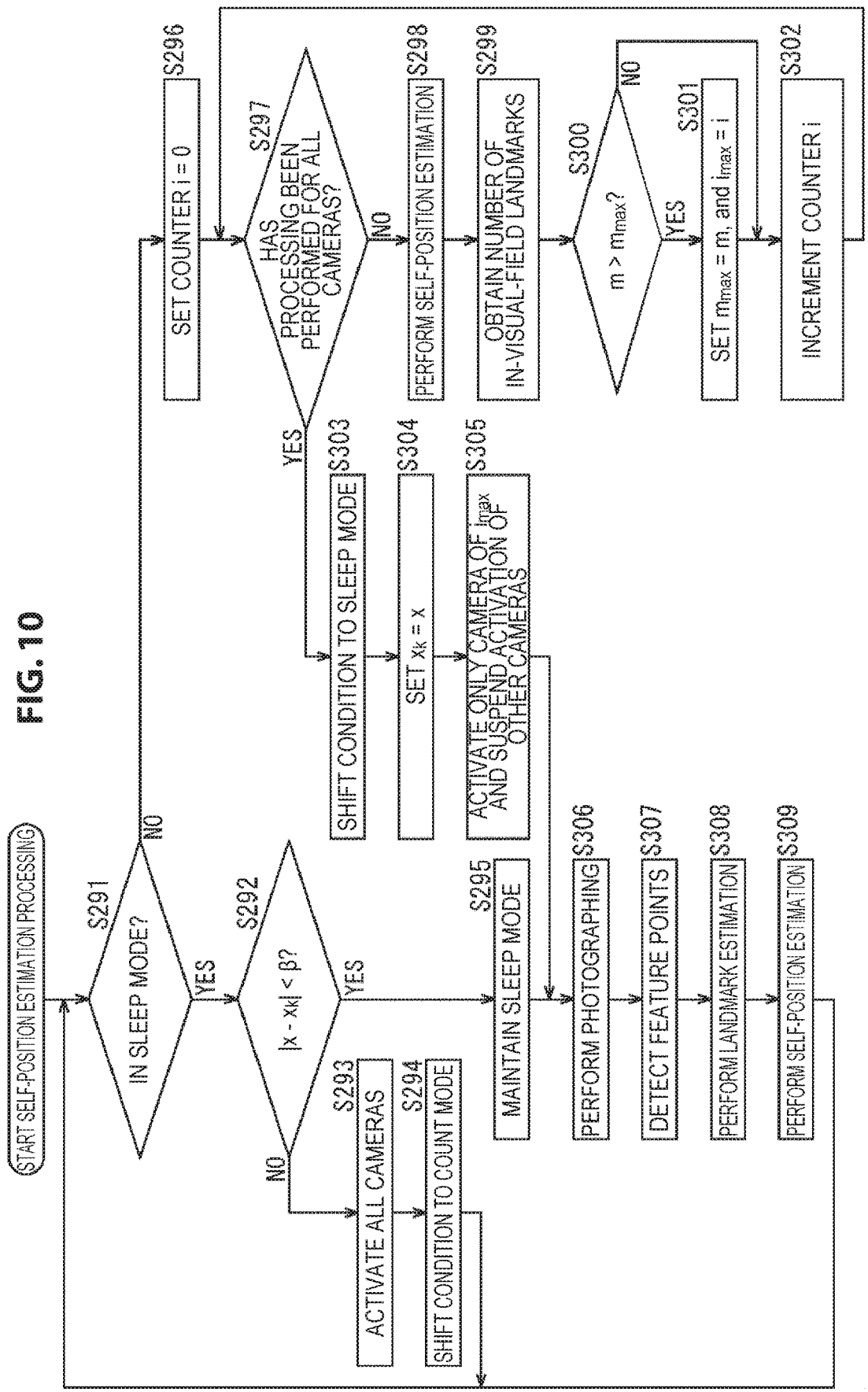
FIG. 10 is a flow chart describing self-position estimation processing.

Hereinafter, self-position estimation processing performed by the self-position estimation system in such a case is described with reference to the flow chart of FIG. 10. In addition, the processing of step S291 to step S297 is similar to the processing of step S171 to step S177 of FIG. 7, and therefore a description thereof is omitted.

Further, if in step S297 the determination of whether processing has been performed for all the cameras 51 or not is performed, after that, the processing of step S298 to step S303 is performed, and a camera 51 in which the number of in-visual-field landmarks m is largest is selected as the activation camera. In addition, the processing of step S298 to step S303 is similar to the processing of step S138 to step S143 of FIG. 6, and therefore a description thereof is omitted.

In step S304, the activation determination unit 62 sets the reference self-position $x_k$=the self-position x at the current time. In step S304, processing similar to step S183 of FIG. 7 is performed.

If the reference self-position $x_k$ is updated, after that, the processing of step S305 is performed, and the processing goes to step S306; the processing of step S305 is similar to the processing of step S24 of FIG. 3, and therefore a description thereof is omitted.

If in step S305 the activation control of the camera 51 has been performed or in step S295 the sleep mode is maintained, the processing of step S306 to step S309 is performed and the processing returns to step S291, and the processing described above is performed repeatedly. Further, if it is instructed that the estimation of the self-position of the user be finished, the self-position estimation processing finishes.

In addition, the processing of step S306 to step S309 is similar to the processing of step S25 to step S28 of FIG. 3, and therefore a description thereof is omitted.

In the above manner, if the self-position has moved a predetermined distance or more from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the self-position moves a predetermined distance or more and selecting, as the activation camera, a camera 51 that can observe the largest number of landmarks, the self-position can be reliably estimated with sufficient accuracy even with small power consumption.

<Third Embodiment>
<Description of Self-position Estimation Processing>

Furthermore, the condition may be shifted to the count mode at the timing at which the proportion of the number of feature points detected from the photographing image that is obtained by the activation camera during the state of the sleep mode to the number of feature points serving as a reference is decreasing.

Figure 11:
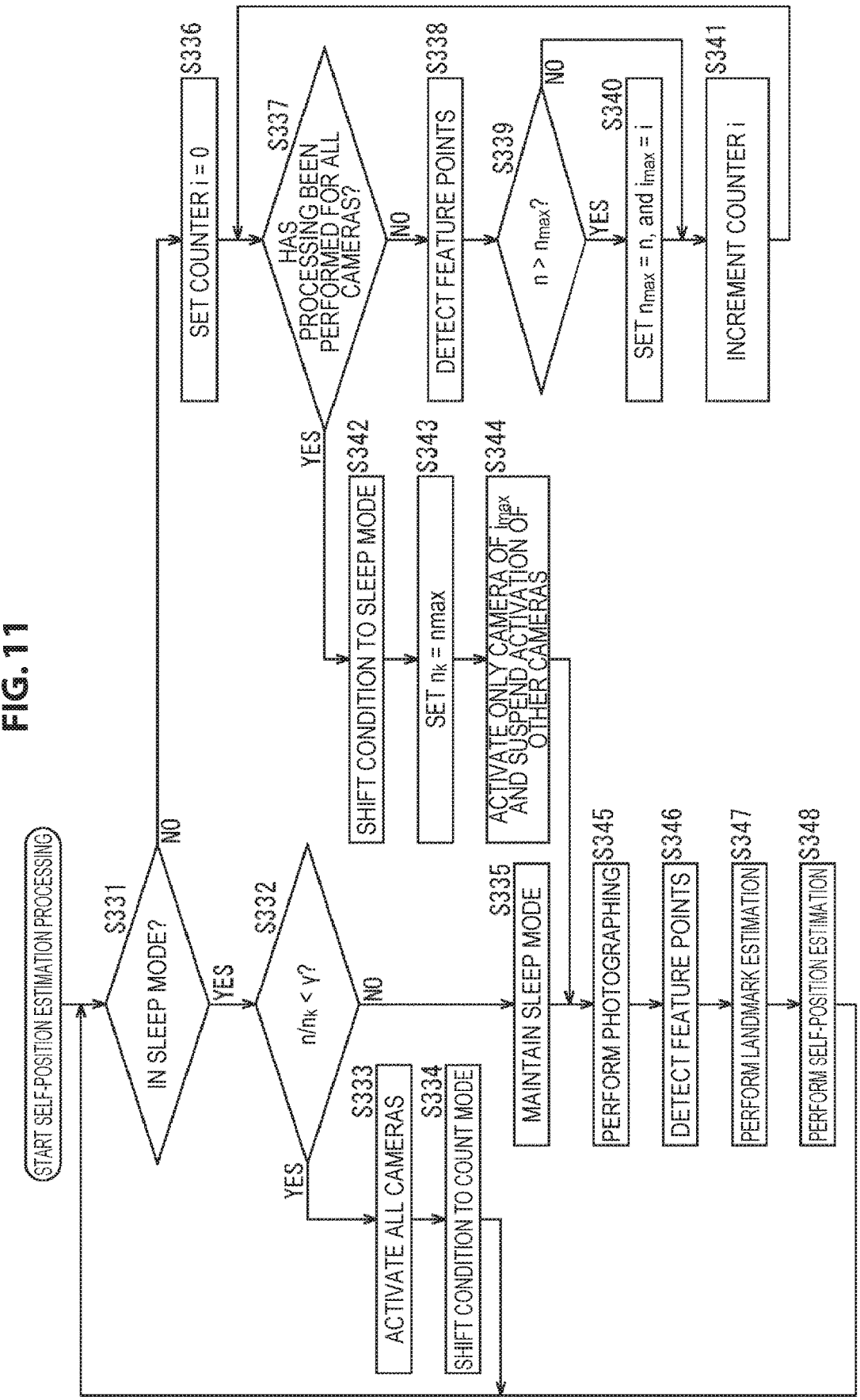
FIG. 11 is a flow chart describing self-position estimation processing.

Hereinafter, self-position estimation processing performed by the self-position estimation system in such a case is described with reference to the flow chart of FIG. 11. In addition, the processing of step S331 is similar to the processing of step S11 of FIG. 3, and therefore a description thereof is omitted.

In a case where in step S331 it is determined that the condition is in the sleep mode, the activation determination unit 62 acquires, as the number of feature points n, the number of feature points detected from the newest photographing image of the activation camera from the feature point detection unit 71 of the self-position estimation unit 61, and the processing goes to step S332. Here, the newest photographing image from which the number of feature points n is to be acquired is a photographing image photographed by the activation camera in the state of the sleep mode.

In step S332, the activation determination unit 62 determines whether the ratio $n/n_k$ between the newest number of feature points n acquired and a reference number of feature points $n_k$ that is the number of feature points serving as a reference that it holds is less than a predetermined threshold $\gamma$ or not, that is, whether $n/n_k<\gamma$ or not.

The activation determination unit 62 holds, as the reference number of feature points $n_k$, the maximum value among the numbers of feature points obtained for the photographing images of the cameras 51 at the time when the condition shifted (transitioned) from the count mode to the sleep mode for the last time. Thus, in the processing of step S332, to what degree the proportion of the number of feature points of the activation camera at the current time to the maximum value of the number of feature points at the time point at which the condition entered the sleep mode has decreased with this time point as a reference is determined. Then, for example, control is made so that the condition shifts from the sleep mode to the count mode when the number of feature points observed at the current time has decreased and reached $n/n_k<\gamma$.

In a case where in step S332 it is determined that $n/n_k<\gamma$, that is, the number of feature points observed has decreased after the condition entered the sleep mode and the number of feature points is not sufficient, the activation determination unit 62 instructs the activation switching unit 63 to activate all the cameras 51, and the processing goes to step S333.

Then, after that, the processing of step S333 and step S334 is performed and the processing returns to step S331, and the processing described above is performed repeatedly. In addition, the processing of step S333 and step S334 is similar to the processing of step S13 and step S14 of FIG. 3, and therefore a description thereof is omitted.

Further, in a case where in step S332 it is determined that $n/n_k<\gamma$ does not hold, that is, the condition is in a state where a sufficient number of feature points are observed, in step S335 the activation determination unit 62 maintains the state of the sleep mode.

If the state of the sleep mode is maintained, after that, the processing goes to step S345.

Further, in a case where in step S331 it is determined that the condition is not in the sleep mode, that is, in a case where the condition is in the count mode, the processing goes to step S336.

Then, the processing of step S336 to step S342 is performed; these pieces of processing are similar to the processing of step S16 to step S22 of FIG. 3, and therefore a description thereof is omitted.

In step S343, the activation determination unit 62 sets the reference number of feature points $n_k$=the number of feature points $n_{max}$.

That is, the activation determination unit 62 updates the reference number of feature points $n_k$ so that the reference number of feature points $n_k$ that it holds is the maximum value among the numbers of feature points detected from the photographing images at the current time, that is, the number of feature points $n_{max}$ that is the maximum value among the numbers of feature points detected from the photographing images by the processing of step S338.

Thereby, the maximum value of the number of feature points at the time point when the condition has shifted from the count mode to the sleep mode is taken as the new reference number of feature points $n_k$. In addition, in this example, the number of feature points $n_{max}$ taken as the reference number of feature points $n_k$ is the same as the number of feature points $n_{max}$ obtained in the processing of step S340.

If the reference number of feature points $n_k$ is updated, after that, the processing of step S344 is performed, and the processing goes to step S345; the processing of step S344 is similar to the processing of step S24 of FIG. 3, and therefore a description thereof is omitted.

If in step S344 the activation control of the camera 51 has been performed or in step S335 the sleep mode is maintained, the processing of step S345 to step S348 is performed and the processing returns to step S331, and the processing described above is performed repeatedly. Further, if it is instructed that the estimation of the self-position of the user be finished, the self-position estimation processing finishes.

In addition, the processing of step S345 to step S348 is similar to the processing of step S25 to step S28 of FIG. 3, and therefore a description thereof is omitted.

In the above manner, if the ratio between the reference number of feature points and the number of feature points at the current time has decreased to less than the threshold from when the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the ratio between the reference number of feature points and the number of feature points at the current time becomes less than the threshold and selecting, as the activation camera, a camera 51 that can detect the largest number of feature points, the self-position can be reliably estimated with sufficient accuracy even with small power consumption.

<Modification Example 1 of Third Embodiment>
<Description of Self-position Estimation Processing>

Further, also in a case where the determination of whether to shift to the count mode or not is performed on the basis of the ratio of the number of feature points, one or a plurality of cameras 51 may be selected as the activation camera as described with reference to FIG. 4.

Figure 12:
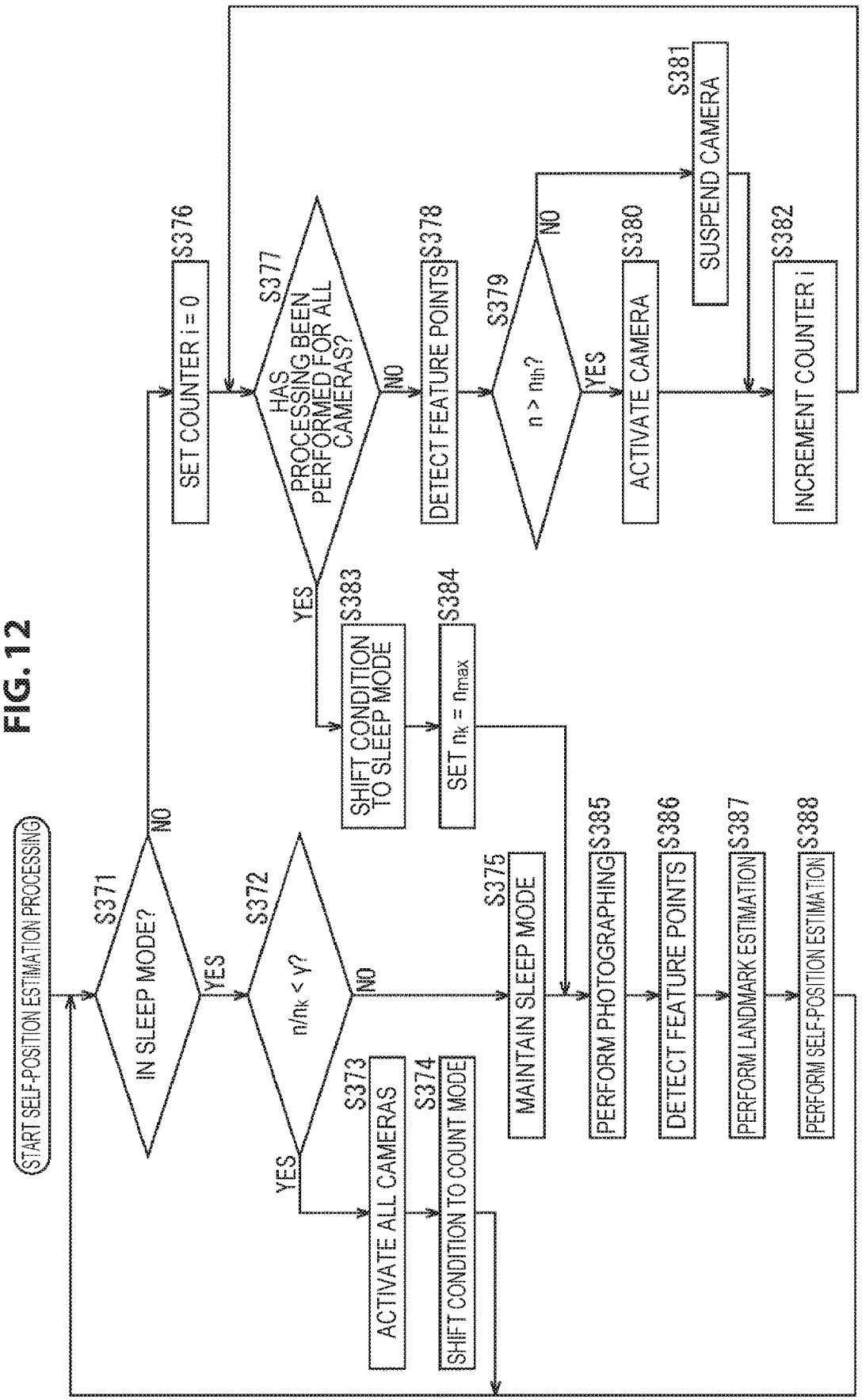
FIG. 12 is a flow chart describing self-position estimation processing.

Hereinafter, self-position estimation processing performed by the self-position estimation system in such a case is described with reference to the flow chart of FIG. 12. In addition, the processing of step S371 to step S378 is similar to the processing of step S331 to step S338 of FIG. 11, and therefore a description thereof is omitted.

Further, if in step S378 feature points are detected, after that, the processing of step S379 to step S383 is performed, and a camera 51 in which the number of feature points n is larger than a threshold $n_{th}$ is selected as the activation camera. In addition, the processing of step S379 to step S383 is similar to the processing of step S59 to step S63 of FIG. 4, and therefore a description thereof is omitted.

In step S384, the activation determination unit 62 sets the reference number of feature points $n_k$=the number of feature points $n_{max}$. In step S384, processing similar to step S343 of FIG. 11 is performed.

If in step S384 the reference number of feature points $n_k$ has been updated or in step S375 the sleep mode is maintained, the processing of step S385 to step S388 is performed and the processing returns to step S371, and the processing described above is performed repeatedly. Further, if it is instructed that the estimation of the self-position of the user be finished, the self-position estimation processing finishes.

In addition, the processing of step S385 to step S388 is similar to the processing of step S25 to step S28 of FIG. 3, and therefore a description thereof is omitted.

In the above manner, if the ratio between the reference number of feature points and the number of feature points at the current time has decreased to less than the threshold after the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the ratio between the reference number of feature points and the number of feature points at the current time becomes less than the threshold and selecting, as the activation camera, a camera 51 that can detect a larger number than the threshold of feature points, the self-position can be reliably estimated with sufficient accuracy even with small power consumption.

<Modification Example 2 of Third Embodiment>
<Description of Self-position Estimation Processing>

Further, also in a case where the determination of whether to shift to the count mode or not is performed on the basis of the ratio of the number of feature points, the activation camera may be selected on the basis of the area S of feature points as described with reference to FIG. 5.

Figure 13:
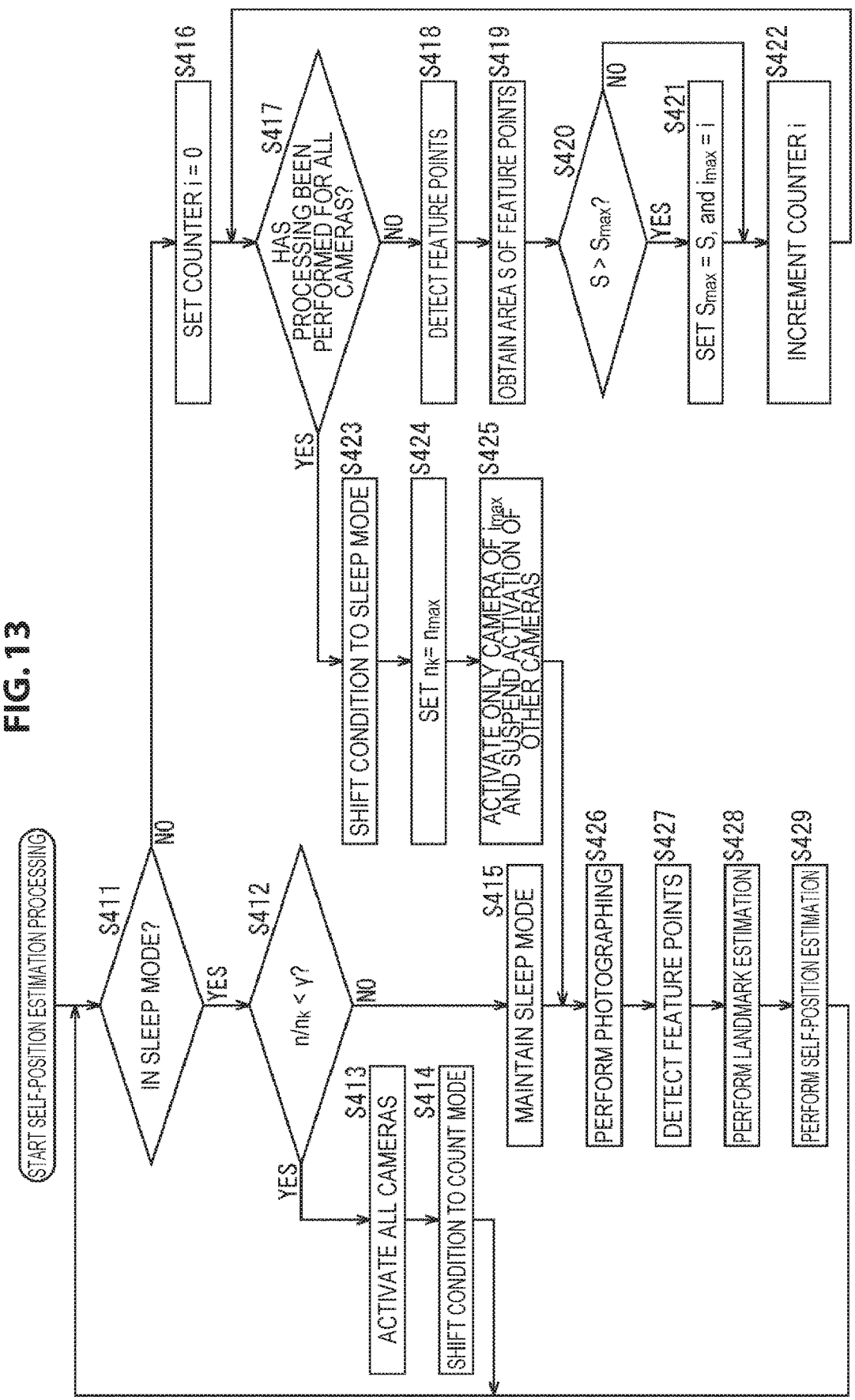
FIG. 13 is a flow chart describing self-position estimation processing.

Hereinafter, self-position estimation processing performed by the self-position estimation system in such a case is described with reference to the flow chart of FIG. 13. In addition, the processing of step S411 to step S418 is similar to the processing of step S331 to step S338 of FIG. 11, and therefore a description thereof is omitted.

Further, if in step S418 feature points are detected, after that, the processing of step S419 to step S423 is performed, and a camera 51 in which the area S of feature points is largest is selected as the activation camera. In addition, the processing of step S419 to step S423 is similar to the processing of step S99 to step S103 of FIG. 5, and therefore a description thereof is omitted.

In step S424, the activation determination unit 62 sets the reference number of feature points $n_k$=the number of feature points $n_{max}$. In step S424, processing similar to step S343 of FIG. 11 is performed.

If the reference number of feature points $n_k$ is updated, after that, the processing of step S425 is performed, and the processing goes to step S426; the processing of step S425 is similar to the processing of step S24 of FIG. 3, and therefore a description thereof is omitted.

If in step S425 the activation control of the camera 51 has been performed or in step S415 the sleep mode is maintained, the processing of step S426 to step S429 is performed and the processing returns to step S411, and the processing described above is performed repeatedly. Further, if it is instructed that the estimation of the self-position of the user be finished, the self-position estimation processing finishes.

In addition, the processing of step S426 to step S429 is similar to the processing of step S25 to step S28 of FIG. 3, and therefore a description thereof is omitted.

In the above manner, if the ratio between the reference number of feature points and the number of feature points at the current time has decreased to less than the threshold after the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the ratio between the reference number of feature points and the number of feature points at the current time becomes less than the threshold and selecting, as the activation camera, a camera 51 that can detect the largest number of feature points uniformly, the self-position can be reliably estimated with sufficient accuracy even with small power consumption.

<Modification Example 3 of Third Embodiment>
<Description of Self-position Estimation Processing>

Further, also in a case where the determination of whether to shift to the count mode or not is performed on the basis of the ratio of the number of feature points, the activation camera may be selected on the basis of the number of in-visual-field landmarks m as described with reference to FIG. 6.

Figure 14:
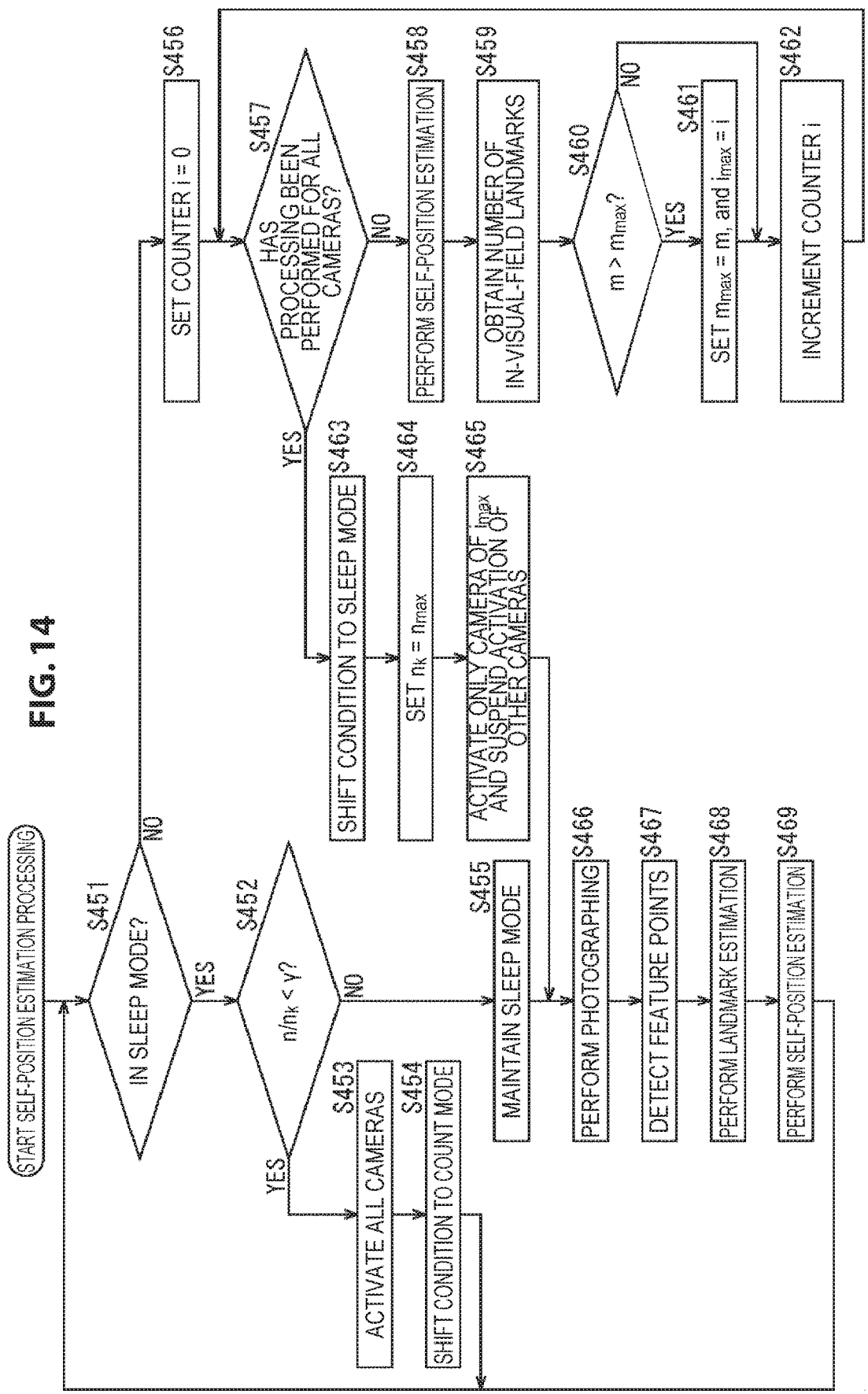
FIG. 14 is a flow chart describing self-position estimation processing.

Hereinafter, self-position estimation processing performed by the self-position estimation system in such a case is described with reference to the flow chart of FIG. 14. In addition, the processing of step S451 to step S457 is similar to the processing of step S331 to step S337 of FIG. 11, and therefore a description thereof is omitted.

Further, if in step S457 the determination of whether processing has been performed for all the cameras 51 or not is performed, after that, the processing of step S458 to step S463 is performed, and a camera 51 in which the number of in-visual-field landmarks m is largest is selected as the activation camera. In addition, the processing of step S458 to step S463 is similar to the processing of step S138 to step S143 of FIG. 6, and therefore a description thereof is omitted.

In step S464, the activation determination unit 62 sets the reference number of feature points $n_k$=the number of feature points $n_{max}$. In step S464, processing similar to step S343 of FIG. 11 is performed.

If the reference number of feature points $n_k$ is updated, after that, the processing of step S465 is performed, and the processing goes to step S466; the processing of step S465 is similar to the processing of step S24 of FIG. 3, and therefore a description thereof is omitted.

If in step S465 the activation control of the camera 51 has been performed or in step S455 the sleep mode is maintained, the processing of step S466 to step S469 is performed and the processing returns to step S451, and the processing described above is performed repeatedly. Further, if it is instructed that the estimation of the self-position of the user be finished, the self-position estimation processing finishes.

In addition, the processing of step S466 to step S469 is similar to the processing of step S25 to step S28 of FIG. 3, and therefore a description thereof is omitted.

In the above manner, if the ratio between the reference number of feature points and the number of feature points at the current time has decreased to less than the threshold after the condition entered the sleep mode, the self-position estimation system shifts to the count mode and selects the activation camera again, and shifts to the sleep mode again. Thereby, self-position estimation can be performed with lower power consumption.

In particular, by selecting the activation camera again at the timing at which the ratio between the reference number of feature points and the number of feature points at the current time becomes less than the threshold and selecting, as the activation camera, a camera 51 that can observe the largest number of landmarks, the self-position can be reliably estimated with sufficient accuracy even with small power consumption.

<Fourth Embodiment>
<Description of Self-position Estimation Processing>

Furthermore, the condition may be shifted to the count mode at the timing at which the amount of movement, in particular the amount of rotation, of the user (the camera 51) from a state serving as a reference becomes a predetermined amount or more.

Figure 15:
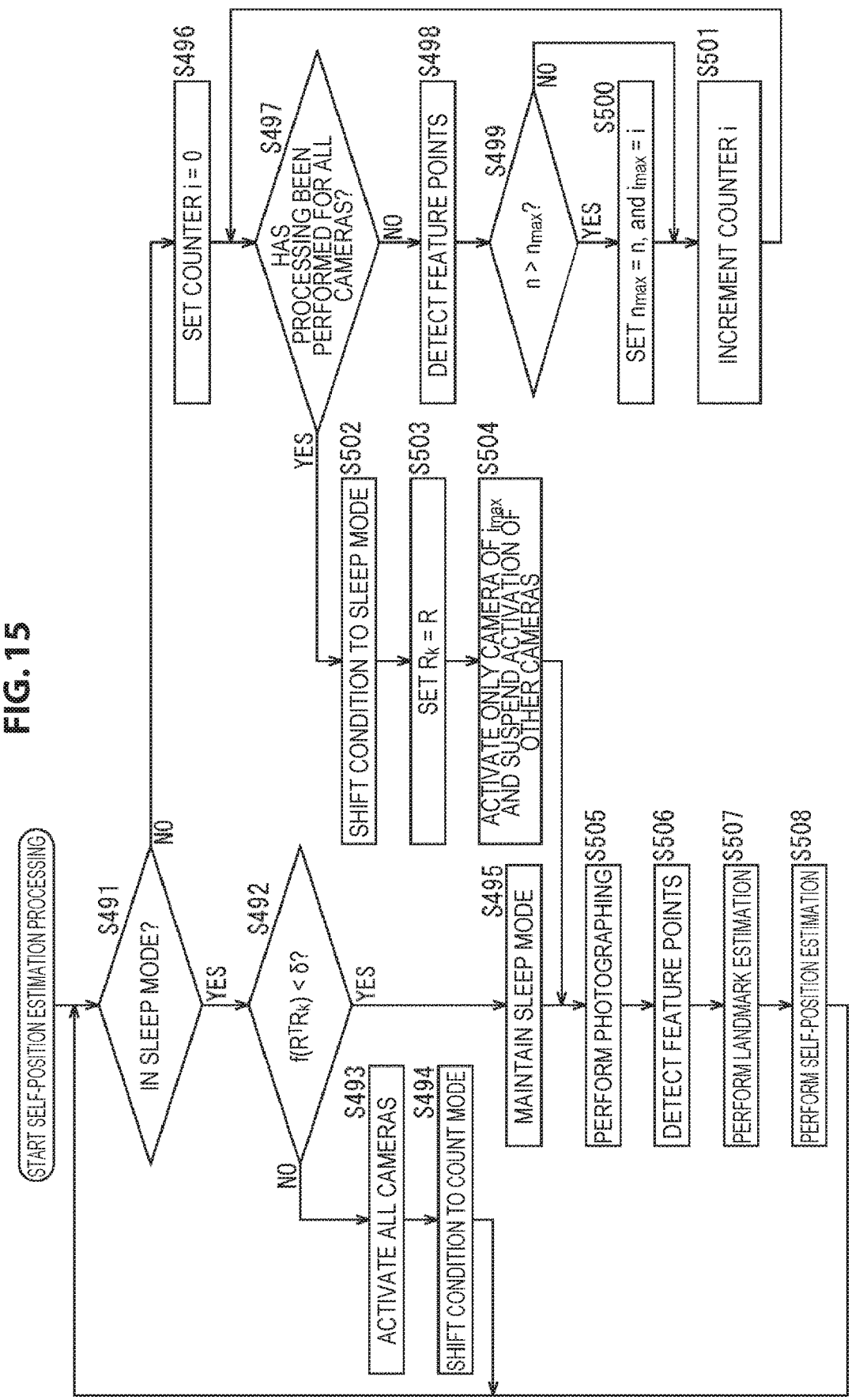
FIG. 15 is a flow chart describing self-position estimation processing.

Hereinafter, self-position estimation processing performed by the self-position estimation system in such a case is described with reference to the flow chart of FIG. 15. In addition, the processing of step S491 is similar to the processing of step S11 of FIG. 3, and therefore a description thereof is omitted.

In a case where in step S491 it is determined that the condition is in the sleep mode, the activation determination unit 62 acquires, from a not-shown gyro sensor provided in the image processing apparatus 52, a rotation matrix R that indicates the amount of rotation of the user (the camera 51) at the current time, and the processing goes to step S492.

In step S492, the activation determination unit 62 determines whether the amount of rotation $f(R^T R_k)$ from a time serving as a reference that is obtained by substituting, into a function, the product of the transposed matrix $R^T$ of the rotation matrix R at the current time acquired and a reference rotation matrix $R_k$ that indicates the amount of rotation at a time serving as a reference that the activation determination unit 62 holds is less than a predetermined threshold δ or not, that is, whether $f(R^T R_k) < δ$ or not. In addition, the amount of rotation $f(R^T R_k)$ is the amount of rotation around the main component of the rotation difference.

The activation determination unit 62 holds, as the reference rotation matrix $R_k$, a rotation matrix R that is the output of the gyro sensor at the time when the condition shifted (transitioned) from the count mode to the sleep mode for the last time. Thus, in the processing of step S492, with the time point when the condition entered the sleep mode as a reference, it is determined whether or not the amount of rotation $f(R^T R_k)$ of the user (the camera 51) from the reference time point to the current time has become the threshold δ or more. Then, control is made so that, when the amount of rotation $f(R^T R_k)$ has become the threshold δ or more, the condition shifts from the sleep mode to the count mode, for example.

In a case where in step S492 it is determined that $f(R^T R_k) < δ$ does not hold, that is, the amount of rotation $f(R^T R_k)$ from when the condition entered the sleep mode is sufficiently large, the activation determination unit 62 instructs the activation switching unit 63 to activate all the cameras 51, and the processing goes to step S493.

Then, after that, the processing of step S493 and step S494 is performed and the processing returns to step S491, and the processing described above is performed repeatedly. In addition, the processing of step S493 and step S494 is similar to the processing of step S13 and step S14 of FIG. 3, and therefore a description thereof is omitted.

Further, in a case where in step S492 it is determined that $f(R^T R_k) < δ$, that is, the condition is in a state where the amount of rotation $f(R^T R_k)$ from when the condition entered the sleep mode is sufficiently small, in step S495 the activation determination unit 62 maintains the state of the sleep mode.

If the state of the sleep mode is maintained, after that, the processing goes to step S505.

Further, in a case where in step S491 it is determined that the condition is not in the sleep mode, that is, in a case where the condition is in the count mode, the processing goes to step S496.

Then, the processing of step S496 to step S502 is performed; these pieces of processing are similar to the processing of step S16 to step S22 of FIG. 3, and therefore a description thereof is omitted.

In step S503, the activation determination unit 62 sets the reference rotation matrix $R_k$=the rotation matrix R.

That is, the activation determination unit 62 updates the reference rotation matrix $R_k$ so that the reference rotation matrix $R_k$ that it holds is the output of the gyro sensor at the current time, that is, a rotation matrix R that is the output of the gyro sensor at the time when the condition is set to the sleep mode in step S502.

If the reference rotation matrix $R_k$ is updated, after that, the processing of step S504 is performed, and the processing goes to step S505; the processing of step S504 is similar to the processing of step S24 of FIG. 3, and therefore a description thereof is omitted.

If in step S504 the activation control of the camera 51 has been performed or in step S495 the sleep mode is maintained, the processing of step S505 to step S508 is performed and the processing returns to step S491, and the processing described above is performed repeatedly. Further, if it is instructed that the estimation of the self-position of the user be finished, the self-position estimation processing finishes.

In addition, the processing of step S505 to step S508 is similar to the processing of step S25 to step S28 of FIG. 3, and therefore a description thereof is omitted.

In the above manner, if the amount of rotation of the user after the condition entered the sleep mode has become the threshold or more, the self-position estimation system shifts to the count mode and selects the activation camera again, and shifts to the sleep mode again. Thereby, self-position estimation can be performed with lower power consumption.

In particular, by selecting the activation camera again at the timing at which the amount of rotation of the user from when the condition entered the sleep mode becomes the threshold or more and selecting, as the activation camera, a camera 51 that can detect the largest number of feature points, the self-position can be reliably estimated with sufficient accuracy even with small power consumption.

<Modification Example 1 of Fourth Embodiment>
<Description of Self-position Estimation Processing>

Further, also in a case where the determination of whether to shift to the count mode or not is performed on the basis of the amount of rotation from a state serving as a reference, one or a plurality of cameras 51 may be selected as the activation camera as described with reference to FIG. 4.

Figure 16:
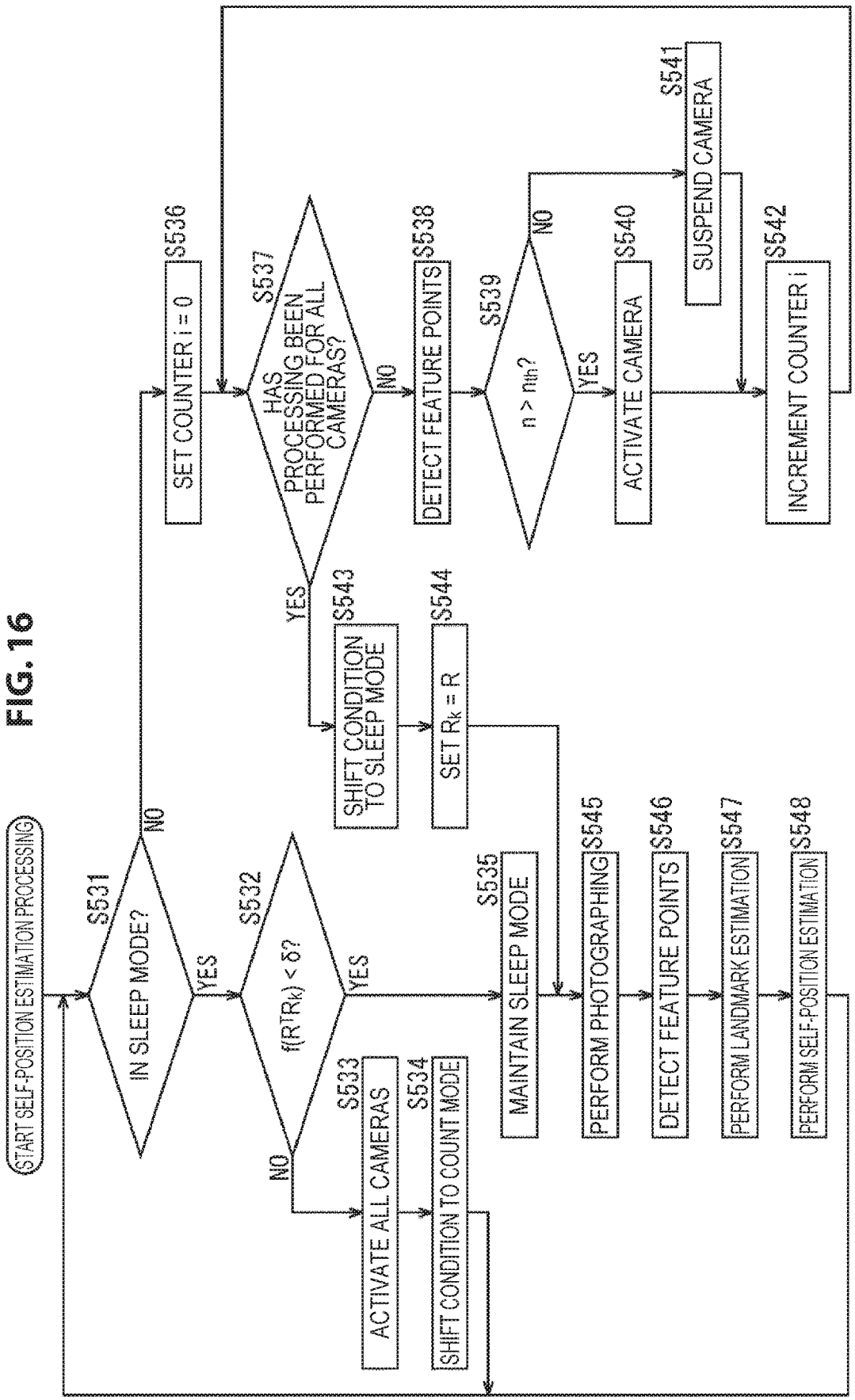
FIG. 16 is a flow chart describing self-position estimation processing.

Hereinafter, self-position estimation processing performed by the self-position estimation system in such a case is described with reference to the flow chart of FIG. 16. In addition, the processing of step S531 to step S538 is similar to the processing of step S491 to step S498 of FIG. 15, and therefore a description thereof is omitted.

Further, if feature points are detected in step S538, after that, the processing of step S539 to step S543 is performed, and a camera 51 in which the number of feature points n is larger than a threshold $n_{th}$ is selected as the activation camera. In addition, the processing of step S539 to step S543 is similar to the processing of step S59 to step S63 of FIG. 4, and therefore a description thereof is omitted.

In step S544, the activation determination unit 62 sets the reference rotation matrix $R_k$=the rotation matrix R. In step S544, processing similar to step S503 of FIG. 15 is performed.

If in step S544 the reference rotation matrix $R_k$ has been updated or in step S535 the sleep mode is maintained, the processing of step S545 to step S548 is performed and the processing returns to step S531, and the processing described above is performed repeatedly. Further, if it is instructed that the estimation of the self-position of the user be finished, the self-position estimation processing finishes.

In addition, the processing of step S545 to step S548 is similar to the processing of step S25 to step S28 of FIG. 3, and therefore a description thereof is omitted.

In the above manner, if the amount of rotation of the user from when the condition entered the sleep mode has become the threshold or more, the self-position estimation system shifts to the count mode and selects the activation camera again, and shifts to the sleep mode again. Thereby, self-position estimation can be performed with lower power consumption.

In particular, by selecting the activation camera again at the timing at which the amount of rotation of the user from when the condition entered the sleep mode becomes the threshold or more and selecting, as the activation camera, a camera 51 that can detect a larger number than the threshold of feature points, the self-position can be reliably estimated with sufficient accuracy even with small power consumption.

<Modification Example 2 of Fourth Embodiment>
<Description of Self-position Estimation Processing>

Further, also in a case where the determination of whether to shift to the count mode or not is performed on the basis of the amount of rotation from a state serving as a reference, the activation camera may be selected on the basis of the area S of feature points as described with reference to FIG. 5.

Figure 17:
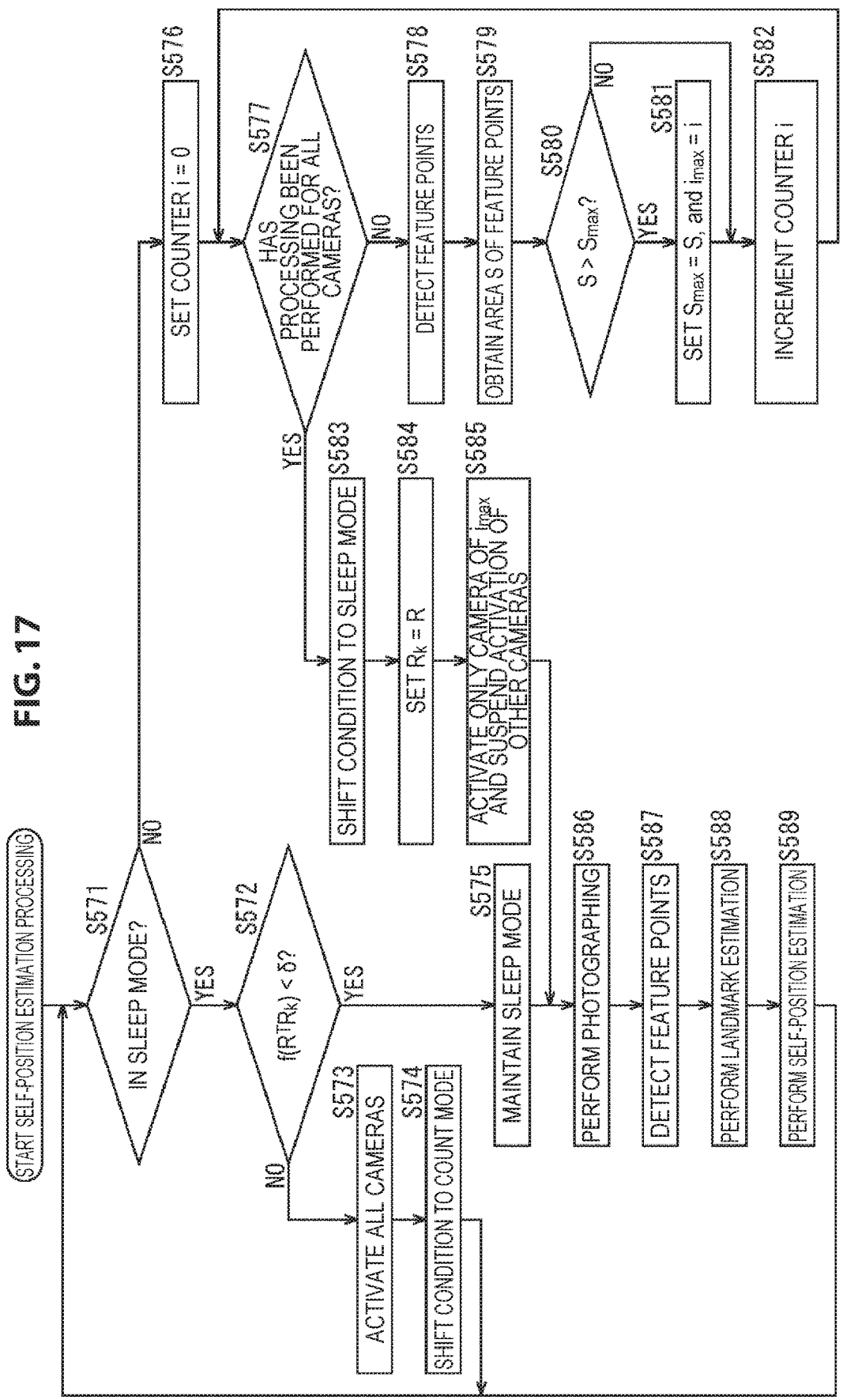
FIG. 17 is a flow chart describing self-position estimation processing.

Hereinafter, self-position estimation processing performed by the self-position estimation system in such a case is described with reference to the flow chart of FIG. 17. In addition, the processing of step S571 to step S578 is similar to the processing of step S491 to step S498 of FIG. 15, and therefore a description thereof is omitted.

Further, if feature points are detected in step S578, after that, the processing of step S579 to step S583 is performed, and a camera 51 in which the area S of feature points is largest is selected as the activation camera. In addition, the processing of step S579 to step S583 is similar to the processing of step S99 to step S103 of FIG. 5, and therefore a description thereof is omitted.

In step S584, the activation determination unit 62 sets the reference rotation matrix $R_k$=the rotation matrix R. In step S584, processing similar to step S503 of FIG. 15 is performed.

If the reference rotation matrix $R_k$ is updated, after that, the processing of step S585 is performed, and the processing goes to step S586; the processing of step S585 is similar to the processing of step S24 of FIG. 3, and therefore a description thereof is omitted.

If in step S585 the activation control of the camera 51 has been performed or in step S575 the sleep mode is maintained, the processing of step S586 to step S589 is performed and the processing returns to step S571, and the processing described above is performed repeatedly. Further, if it is instructed that the estimation of the self-position of the user be finished, the self-position estimation processing finishes.

In addition, the processing of step S586 to step S589 is similar to the processing of step S25 to step S28 of FIG. 3, and therefore a description thereof is omitted.

In the above manner, if the amount of rotation of the user from when the condition entered the sleep mode has become the threshold or more, the self-position estimation system shifts to the count mode and selects the activation camera again, and shifts to the sleep mode again. Thereby, self-position estimation can be performed with lower power consumption.

In particular, by selecting the activation camera again at the timing at which the amount of rotation of the user from when the condition entered the sleep mode becomes the threshold or more and selecting, as the activation camera, a camera 51 that can detect the largest number of feature points uniformly, the self-position can be reliably estimated with sufficient accuracy even with small power consumption.

<Modification Example 3 of Fourth Embodiment>
<Description of Self-position Estimation Processing>

Further, also in a case where the determination of whether to shift to the count mode or not is performed on the basis of the amount of rotation from a state serving as a reference, the activation camera may be selected on the basis of the number of in-visual-field landmarks m as described with reference to FIG. 6.

Figure 18:
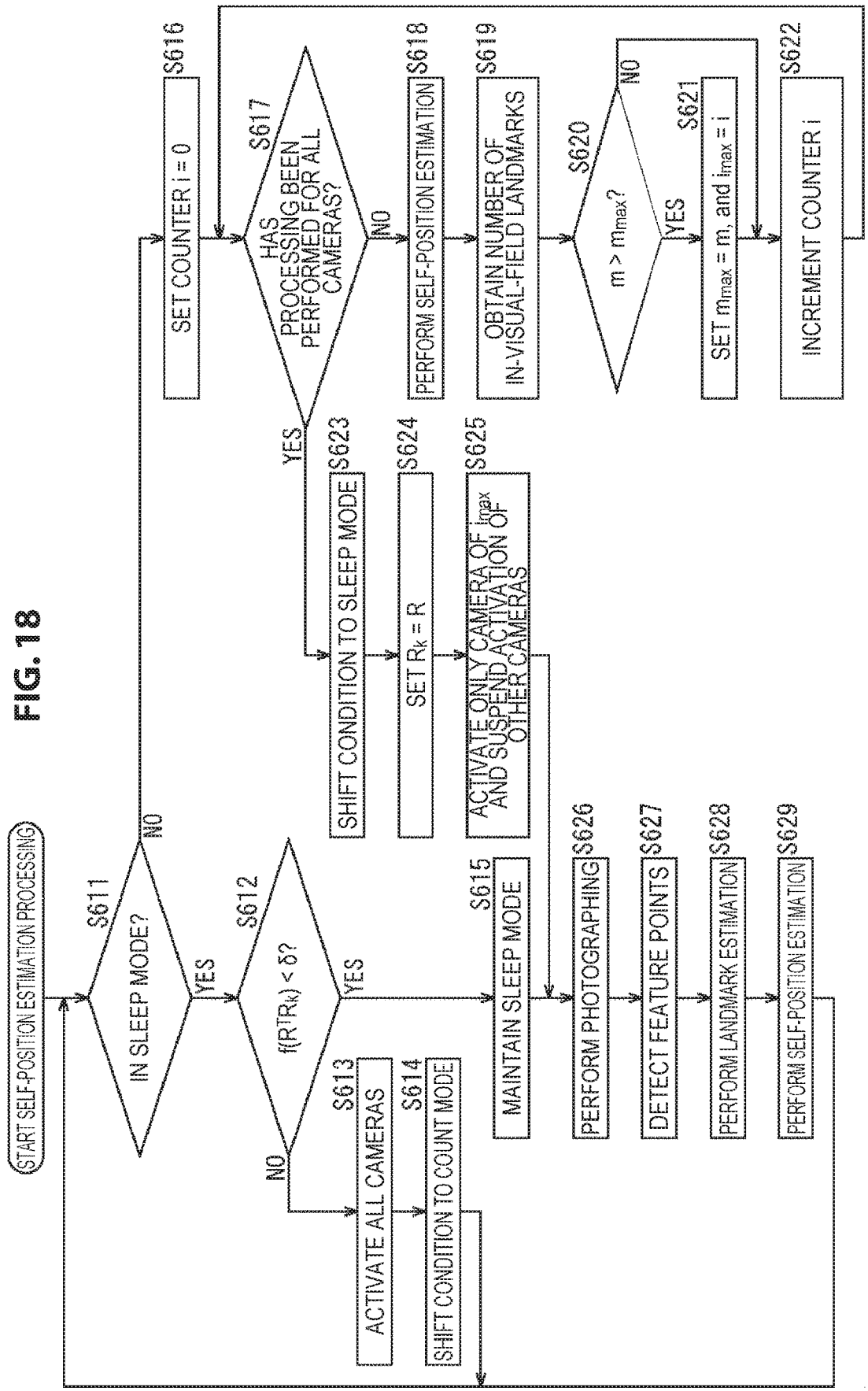
FIG. 18 is a flow chart describing self-position estimation processing.

Hereinafter, self-position estimation processing performed by the self-position estimation system in such a case is described with reference to the flow chart of FIG. 18. In addition, the processing of step S611 to step S617 is similar to the processing of step S491 to step S497 of FIG. 15, and therefore a description thereof is omitted.

Further, if in step S617 the determination of whether processing has been performed for all the cameras 51 or not is performed, after that, the processing of step S618 to step S623 is performed, and a camera 51 in which the number of in-visual-field landmarks m is largest is selected as the activation camera. In addition, the processing of step S618 to step S623 is similar to the processing of step S138 to step S143 of FIG. 6, and therefore a description thereof is omitted.

In step S624, the activation determination unit 62 sets the reference rotation matrix $R_k$=the rotation matrix R. In step S624, processing similar to step S503 of FIG. 15 is performed.

If the reference rotation matrix $R_k$ is updated, after that, the processing of step S625 is performed, and the processing goes to step S626; the processing of step S625 is similar to the processing of step S24 of FIG. 3, and therefore a description thereof is omitted.

If in step S625 the activation control of the camera 51 has been performed or in step S615 the sleep mode is maintained, the processing of step S626 to step S629 is performed and the processing returns to step S611, and the processing described above is performed repeatedly. Further, if it is instructed that the estimation of the self-position of the user be finished, the self-position estimation processing finishes.

In addition, the processing of step S626 to step S629 is similar to the processing of step S25 to step S28 of FIG. 3, and therefore a description thereof is omitted.

In the above manner, if the amount of rotation of the user from when the condition entered the sleep mode has become the threshold or more, the self-position estimation system shifts to the count mode and selects the activation camera again, and shifts to the sleep mode again. Thereby, self-position estimation can be performed with lower power consumption.

In particular, by selecting the activation camera again at the timing at which the amount of rotation of the user from when the condition entered the sleep mode becomes the threshold or more and selecting, as the activation camera, a camera 51 that can observe the largest number of landmarks, the self-position can be reliably estimated with sufficient accuracy even with small power consumption.

Fifth Embodiment>
<Example of Configuration of Self-position Estimation System>

Further, although in the above an example in which the activation camera and the activation suspension camera are selected on the basis of a photographing image obtained by a camera 51 that is the object of activation control is described, the activation camera and the activation suspension camera may be selected on the basis of information obtained by another camera.

Figure 19:
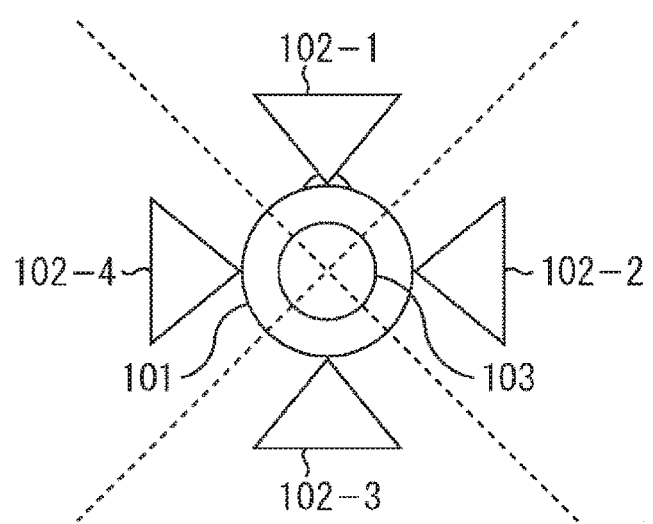
FIG. 19 is a diagram showing an example of the configuration of a self-position estimation system.

In such a case, the self-position estimation system is configured as shown in FIG. 19, for example.

In this example, a user 101 who is the object of self-position estimation wears 4 cameras 102-1 to 102-4, and the self-position of the user 101 is estimated on the basis of photographing images obtained by the camera 102-1 to the camera 102-4.

In addition, hereinafter, in a case where there is no need to particularly distinguish the camera 102-1 to the camera 102-4, they may be referred to simply as a camera 102.

In FIG. 19, each camera 102 corresponds to the camera 51 shown in FIG. 2, and self-position estimation is performed by each of these cameras 102 being taken as the activation camera or the activation suspension camera. Further, the self-position estimation system including the camera 102 further includes an all-round camera 103 and the image processing apparatus 52 (not shown in FIG. 19) shown in FIG. 2.

The all-round camera 103 is worn on the user 101, and functions as a wide-angle camera that photographs the entire surroundings of the user 101 as the subject. That is, the all-round camera 103 functions as a wide-angle camera capable of photographing the observation fields of all the cameras 102.

However, although the all-round camera 103 is a wide-angle camera that has an angle of view of 360 degrees and can photograph all directions, the spatial resolution is lower in the image obtained by the all-round camera 103 than in the image obtained by the camera 102. Hence, if the image obtained by the all-round camera 103 is used for self-position estimation, the self-position cannot be estimated with sufficient accuracy.

In such a self-position estimation system, the image obtained by the all-round camera 103 (hereinafter, occasionally referred to as an all-round image) is divided into 4 divided regions, and each camera 102 is assigned to each of the divided regions. That is, the camera 102 is assigned to the divided region so that the observation field of each camera 102 and the observation field of the all-round camera 103 corresponding to each divided region are identical. In other words, the assignment is made so that the subject of the photographing image obtained by the camera 102 and the subject of the divided region are identical.

The feature point detection unit 71 constituting the self-position estimation system detects feature points from each divided region of the all-round image. Furthermore, on the basis of the detection result, the activation determination unit 62 selects, as the activation camera, a camera 102 corresponding to a divided region in which the number of feature points is largest, and takes the other cameras 102 as the activation suspension camera.

In this case, there is no need to perform photographing with all the cameras 102 and select the activation camera; therefore, there is no need to shift to the count mode. In addition, with regard to what timing to switch the activation camera at, the activation camera may be switched at any timing, for example switched at fixed time intervals or switched on the basis of the movement distance of the self-position of the user, the ratio of the number of feature points, the amount of rotation of the user, etc., as described above.

Further, the method for selecting the activation camera is not limited to using the number of feature points in each divided region, but may be any method, such as taking as the activation camera a camera 102 corresponding to a divided region in which a threshold number or more of feature points are detected, taking as the activation camera a camera 102 corresponding to a divided region in which the area of feature points is largest, or taking as the activation camera a camera 102 corresponding to a divided region in which the number of in-visual-field landmarks is largest.

According to the present technology described in the first embodiment to the fifth embodiment above, a situation in which a feature point necessary for self-position estimation is not detected from the photographing image of the activation camera can be avoided by performing self-position estimation while combining a plurality of cameras. That is, self-position estimation can be performed more reliably.

Furthermore, by combining a plurality of cameras, a photographing image of a higher resolution than in a case of using an all-round camera can be obtained, and the self-position can be estimated with higher accuracy.

Furthermore, since only necessary cameras among a plurality of cameras are activated and the activation of the other cameras is temporarily suspended, self-position estimation can be performed with power consumption substantially equal to that in a case of using a single camera.

In addition, in the present technology, the examples described above may be freely combined for use as an index that decides the timing of shift to the count mode and an index in the selection of the activation camera.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose computer or the like that is capable of executing various functions when various programs are installed.

FIG. 20 is a block diagram showing an example configuration of the hardware of a computer that executes the series of processes described earlier according to a program.

In a computer, a CPU (Central Processing Unit) 501, a ROM (Read Only Memory) 502, and a RAM (Random Access Memory) 503 are mutually connected by a bus 504.

An input/output interface 505 is also connected to the bus 504. An input unit 506, an output unit 507, a recording unit 508, a communication unit 509, and a drive 510 are connected to the input/output interface 505.

The input unit 506 is configured from a keyboard, a mouse, a microphone, an imaging element or the like. The output unit 507 configured from a display, a speaker or the like. The recording unit 508 is configured from a hard disk, a non-volatile memory or the like. The communication unit 509 is configured from a network interface or the like. The drive 510 drives a removable medium 511 such as a magnetic disk, an optical disk, a magneto-optical disk, a semiconductor memory or the like.

In the computer configured as described above, as one example the CPU 501 loads a program recorded in the recording unit 508 via the input/output interface 505 and the bus 504 into the RAM 503 and executes the program to carry out the series of processes described earlier.

As one example, the program executed by the computer (the CPU 501) may be provided by being recorded on the removable medium 511 as a packaged medium or the like. The program can also be provided via a wired or wireless transfer medium, such as a local area network, the Internet, or a digital satellite broadcast.

In the computer, by loading the removable medium 511 into the drive 510, the program can be installed into the recording unit 508 via the input/output interface 505. It is also possible to receive the program from a wired or wireless transfer medium using the communication unit 509 and install the program into the recording unit 508. As another alternative, the program can be installed in advance into the ROM 502 or the recording unit 508.

Note that the program executed by the computer may be a program in which processes are carried out in a time series in the order described in this specification or may be a program in which processes are carried out in parallel or at necessary timing, such as when the processes are called.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

In addition, the effects described in the present specification are not limiting but are merely examples, and there may be additional effects.

Additionally, the present technology may also be configured as below.

(1)

A control device including:

an activation determination unit configured to select some of a plurality of cameras as activation cameras to be used for self-position estimation; and an activation switching unit configured to, on the basis of a selection result of the activation cameras, set the cameras taken as the activation cameras among the plurality of cameras to an activation state and cause the cameras to photograph images, and suspend activation of the camera different from the activation cameras among the plurality of cameras.

(2)

The control device according to (1), in which the activation determination unit selects the activation cameras again at a predetermined timing.

(3)

The control device according to (2), in which the activation determination unit causes a condition to shift, at the predetermined timing, from a sleep mode in which photographing is performed by the activation cameras to a count mode in which all the plurality of cameras are activated, and selects the activation cameras on the basis of images photographed by the plurality of cameras in a state of the count mode.

(4)

The control device according to (3), in which the activation determination unit selects the activation cameras on the basis of a number of feature points detected from the image photographed by the camera.

(5)

The control device according to (3), in which the activation determination unit selects the activation cameras on the basis of distribution of feature points on a space, the feature points being detected from the image photographed by the camera.

(6)

The control device according to (3), in which the activation determination unit selects the activation cameras on the basis of distribution of feature points on the image, the feature points being detected from the image photographed by the camera.

(7)

The control device according to (3), in which the activation determination unit selects the activation cameras on the basis of a number of feature points that correspond to landmarks shown by a three-dimensional map used for the self-position estimation, the feature points being detected from the image photographed by the camera.

(8)

The control device according to any one of (3) to (7), in which the activation determination unit causes a condition to shift from the sleep mode to the count mode at a fixed time interval.

(9)

The control device according to any one of (3) to (7), in which the activation determination unit causes a condition to shift from the sleep mode to the count mode on the basis of a number of feature points detected from the images photographed by the activation cameras in a state of the sleep mode.

(10)

The control device according to any one of (3) to (7), in which the activation determination unit causes a condition to shift from the sleep mode to the count mode on the basis of a proportion of a number of feature points detected from the images photographed by the activation cameras in a state of the sleep mode to a number of feature points serving as a reference.

(11)

The control device according to any one of (3) to (7), in which the activation determination unit causes a condition to shift from the sleep mode to the count mode on the basis of a result of the self-position estimation.

(12)
The control device according to any one of (3) to (7), in which the activation determination unit causes a condition to shift from the sleep mode to the count mode on the basis of a movement distance or an amount of rotation of the camera.

(13)
The control device according to (2), in which the activation determination unit selects the activation cameras on the basis of a positional relationship between a self-position obtained by the self-position estimation and a landmark shown by a three-dimensional map used for the self-position estimation.

(14)
The control device according to (2), in which the activation determination unit selects the activation cameras on the basis of an image obtained by a wide-angle camera capable of photographing an observation field of each of the plurality of cameras.

(15)
The control device according to any one of (1) to (14), in which the plurality of cameras are arranged on a spherical surface or on a circumference of a circle.

(16)
The control device according to any one of (1) to (15), further including:
a self-position estimation unit configured to perform the self-position estimation on the basis of the images photographed by the activation cameras.

(17)
A control method including:
a step of selecting some of a plurality of cameras as activation cameras to be used for self-position estimation; and
a step of, on the basis of a selection result of the activation cameras, setting the cameras taken as the activation cameras among the plurality of cameras to an activation state and causing the cameras to photograph images, and suspending activation of the camera different from the activation cameras among the plurality of cameras.

(18)
A program for causing a computer to execute processing including
a step of selecting some of a plurality of cameras as activation cameras to be used for self-position estimation, and
a step of, on the basis of a selection result of the activation cameras, setting the cameras taken as the activation cameras among the plurality of cameras to an activation state and causing the cameras to photograph images, and suspending activation of the camera different from the activation cameras among the plurality of cameras.

REFERENCE SIGNS LIST 51-1 to 51-K, and 51 camera
52 image processing apparatus
61 self-position estimation unit
62 activation determination unit
63 activation switching unit
71 feature point detection unit
72 landmark estimation unit
73 self-position calculation unit
102-1 to 102-4, and 102 camera
103 all-round camera

The invention claimed is:

1. A control device, comprising:
a central processing unit (CPU) configured to:
activate, in a count mode, a plurality of cameras;
control, in the count mode, the plurality of cameras to capture a first plurality of images;
select at least a first camera of the plurality of cameras as an activation camera for a self-position estimation process, wherein the first camera is selected as the activation camera based on the captured first plurality of images;
switch from the count mode to a sleep mode based on the selection;
activate, in the sleep mode, the activation camera based on the selection of the first camera as the activation camera;
deactivate, in the sleep mode, the plurality of cameras other than the activation camera based on the selection;
control, in the sleep mode, the activation camera to capture at least one image;
execute the self-position estimation process based on the at least one image;
switch from the sleep mode to the count mode after a specific time interval;
control the plurality of cameras to capture a second plurality of images based on the switch from the sleep mode to the count mode; and
select at least a second camera of the plurality of cameras as the activation camera for the self-position estimation process, wherein the second camera is selected as the activation camera based on the captured second plurality of images.

2. The control device according to claim 1, wherein the CPU is further configured to select the first camera as the activation camera based on a number of a plurality of feature points detected from each image of the first plurality of images.

3. The control device according to claim 1, wherein
the CPU is further configured to select the first camera as the activation camera based on a distribution of a plurality of feature points in space, and
the plurality of feature points is detected from each image of the first plurality of images.

4. The control device according to claim 1, wherein
the CPU is further configured to select the first camera as the activation camera based on a distribution of a plurality of feature points on each image of the first plurality of images, and
the plurality of feature points is detected from the each image of the first plurality of images.

5. The control device according to claim 1, wherein the CPU is further configured to:
select the first camera as the activation camera based on a number of a plurality of feature points that corresponds to a plurality of landmarks, wherein
the plurality of landmarks is represented by a three-dimensional map, and
the number of the plurality of feature points is detected from each image of the first plurality of images; and
execute the self-position estimation process based on the three-dimensional map.

6. The control device according to claim 1, wherein the specific time interval is a fixed time interval.

7. The control device according to claim 1, wherein
the CPU is further configured to switch from the sleep mode to the count mode based on a number of a plurality of feature points, and
the number of the plurality of feature points is detected from the at least one image captured by the activation camera in the sleep mode.

8. The control device according to claim 1, wherein
the CPU is further configured to switch from the sleep mode to the count mode based on a proportion of a specific number of a plurality of feature points detected from the at least one image to a reference number of the plurality of feature points.

9. The control device according to claim 1, wherein the CPU is further configured to switch from the sleep mode to the count mode based on a result of the execution of the self-position estimation process.

10. The control device according to claim 1, wherein the CPU is further configured to switch from the sleep mode to the count mode based on one of a movement distance of the first camera or an amount of rotation of the first camera.

11. The control device according to claim 1, wherein the CPU is further configured to:
execute the self-position estimation process by utilization of a three-dimensional map;
obtain a self-position value based on the execution of the self-position estimation process; and
select the second camera as the activation camera based on a positional relationship between a landmark and the self-position value, wherein the landmark is represented by the three-dimensional map.

12. The control device according to claim 1, wherein
the CPU is further configured to select the first camera as the activation camera based on a specific image captured by a wide-angle camera, and
the wide-angle camera captures an observation field of each of the plurality of cameras.

13. The control device according to claim 1, wherein the plurality of cameras is on one of a spherical surface or on a circumference of a circle.

14. A control method, comprising:
activating, in a count mode, a plurality of cameras;
controlling, in the count mode, the plurality of cameras to capture a first plurality of images;
selecting at least a first camera of the plurality of cameras as an activation camera for a self-position estimation process, wherein the first camera is selected as the activation camera based on the captured first plurality of images;
switching from the count mode to a sleep mode based on the selection;
activating, in the sleep mode, the activation camera based on the selection of the first camera as the activation camera;
deactivating, in the sleep mode, the plurality of cameras other than the activation camera based on the selection;
controlling, in the sleep mode, the activation camera to capture at least one image;
executing the self-position estimation process based on the at least one image;
switching from the sleep mode to the count mode after a specific time interval;
controlling the plurality of cameras to capture a second plurality of images based on the switch from the sleep mode to the count mode; and
selecting at least a second camera of the plurality of cameras as the activation camera for the self-position estimation process, wherein the second camera is selected as the activation camera based on the captured second plurality of images.

15. A non-transitory computer-readable medium, having stored thereon computer-executable instructions, which when executed by a processor, cause the processor to execute operations, the operations comprising:
activating, in a count mode, a plurality of cameras;
controlling, in the count mode, the plurality of cameras to capture a first plurality of images;
selecting at least a first camera of the plurality of cameras as an activation camera for a self-position estimation process, wherein the first camera is selected as the activation camera based on the captured first plurality of images;
switching from the count mode to a sleep mode based on the selection;
activating, in the sleep mode, the activation camera based on the selection of the first camera as the activation camera;
deactivating, in the sleep mode, the plurality of cameras other than the activation camera based on the selection;
controlling, in the sleep mode, the activation camera to capture at least one image;
executing the self-position estimation process based on the at least one image;
switching from the sleep mode to the count mode after a specific time interval;
controlling the plurality of cameras to capture a second plurality of images based on the switch from the sleep mode to the count mode; and
selecting at least a second camera of the plurality of cameras, as the activation camera for the self-position estimation process, wherein the second camera is selected as the activation camera based on the captured second plurality of images.

* * * * *